US011110966B2

(12) United States Patent
Tashiro et al.

(10) Patent No.: US 11,110,966 B2
(45) Date of Patent: Sep. 7, 2021

(54) FRONT BODY STRUCTURE OF VEHICLE

(71) Applicant: MAZDA MOTOR CORPORATION, Hiroshima (JP)

(72) Inventors: Kuniyoshi Tashiro, Hiroshima (JP); Shigeaki Watanabe, Hiroshima (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 242 days.

(21) Appl. No.: 16/537,812

(22) Filed: Aug. 12, 2019

(65) Prior Publication Data
US 2020/0062313 A1  Feb. 27, 2020

(30) Foreign Application Priority Data

Aug. 22, 2018  (JP) .............................. JP2018-155729

(51) Int. Cl.
*B62D 21/11* (2006.01)
*B62D 25/08* (2006.01)

(52) U.S. Cl.
CPC ............ *B62D 25/085* (2013.01); *B62D 21/11* (2013.01)

(58) Field of Classification Search
USPC ....................................................... 280/788
See application file for complete search history.

(56) References Cited

U.S. PATENT DOCUMENTS

| 8,393,673 B2* | 3/2013 | Terada | B62D 21/152 296/193.09 |
| 2005/0236827 A1* | 10/2005 | Mouch | B62D 21/11 280/788 |
| 2017/0203794 A1* | 7/2017 | Nakamura | B62D 25/04 |
| 2018/0170434 A1* | 6/2018 | Saito | B62D 25/088 |
| 2018/0244315 A1* | 8/2018 | Nakamura | B62D 25/08 |

FOREIGN PATENT DOCUMENTS

| DE | 10 2016 015 016 A1 | 6/2017 | |
| DE | 102016015016 A1 * | 6/2017 | ............ B62D 21/03 |
| DE | 10 2017 006 901 A1 | 2/2018 | |
| DE | 102017006901 A1 * | 2/2018 | ............ B62D 21/02 |
| EP | 2 314 500 A2 | 4/2011 | |
| EP | 2 360 081 A1 | 8/2011 | |
| JP | 2017-007606 A | 1/2017 | |

OTHER PUBLICATIONS

The extended European search report issued by the European Patent Office on Jan. 16, 2020, which corresponds to European Patent Application No. 19191362.3-1009 and is related to U.S. Appl. No. 16/537,812.

* cited by examiner

*Primary Examiner* — John D Walters
*Assistant Examiner* — Hilary L Johns
(74) *Attorney, Agent, or Firm* — Studebaker & Brackett PC

(57) ABSTRACT

A front body structure of the vehicle includes a pair of left and right apron reinforcements, a pair of left and right front side frames, a pair of left and right suspension housings, and a sub-frame. The front body structure of the vehicle further includes a shroud upper that joins the front ends of the apron reinforcements, a pair of left and right shroud members that join the shroud upper and the front ends of the front side frames, and a pair of left and right front joint members that join the front ends of the front side frames and the sub-frame, in which the shroud members are joined to the upper surfaces and the side surfaces of the front side frames.

8 Claims, 22 Drawing Sheets

FRONT BODY STRUCTURE OF VEHICLE

BACKGROUND

Technical Field

The present disclosure relates to a front body structure of a vehicle in which, for example, in front view, a ring-shaped structural frame that is substantially ring-shaped in a vehicle width direction is formed in a front body.

Background Art

In a vehicle such as an automobile, front suspension dampers are joined to the frame members of a vehicle body via suspension housings. The front suspension damper suppresses the up-down movement of the vehicle body by, for example, expanding and contracting according to the unevenness of a road surface and improves the ride comfort for occupants.

Since a relatively large load is likely to act on the suspension housings via the front suspension dampers generally, when the front body is bent and deformed by the load acting via the front suspension dampers, there is a possibility that the steering stability may be reduced and the ride comfort for occupants may be reduced.

Accordingly, for example, JP-A-2017-7606 describes improving the body rigidity of the vicinity of the suspension housings by forming a ring-shaped structural frame that is substantially ring-shaped in front view in the vicinity of the suspension housings using a pair of left and right damper housing reinforcing members that form a closed cross section extending in a vehicle up-down direction together with the suspension housings (damper housings) provided close to the dash panel, a dash upper panel reinforcing member that forms a closed cross section extending in a vehicle width direction together with a cowl box (dash upper panel) that joins the lower ends of left and right front pillars, and a front sub-frame provided on a vehicle lower side of the suspension housings. JP-A-2017-7606 also describes improving the body rigidity against the load acting on the front body using this technique.

Also, when the dash panel and the suspension housings are close to each other in the vehicle front-rear direction, the ring-shaped structural frame that is substantially ring-shaped in front view can be formed by using a cowl box as a closed cross section member joining the left and right suspension housings as described in JP-A-2017-7606.

However, when the suspension housings are separated from the dash panel toward the vehicle front side, since the cowl box cannot be easily used as a closed cross section member connecting the left and right suspension housings, there is a possibility that the body frame capable of improving the body rigidity against the load acting on the front body cannot be formed.

SUMMARY

The present disclosure thus provides a front body structure of a vehicle capable of improving the body rigidity against the load acting on the front body even when the suspension housings are provided in positions separated from the dash panel toward the vehicle front side.

According to the present disclosure, there is provided a front body structure of a vehicle, including a pair of left and right apron reinforcements that are closed cross section members extending in a vehicle front-rear direction in positions separated from each other by a predetermined distance in a vehicle width direction, a pair of left and right front side frames that are closed cross section members extending in the vehicle front-rear direction on a vehicle lower side of the apron reinforcements, and a pair of left and right suspension housings that support upper ends of front suspension dampers in desired positions separated from a dash panel toward a vehicle front side, with the suspension housings being provided across the apron reinforcements and the front side frames, and a sub-frame provided on the vehicle lower side of the front side frames, with the sub-frame swingably supporting a suspension arm. The front body structure further includes a shroud upper that is a closed cross section member joining front ends of the apron reinforcements to each other in the vehicle width direction; a pair of left and right shroud members that are closed cross section members joining the shroud upper and front ends of the front side frames to each other in a vehicle up-down direction; and a pair of left and right joint members that are closed cross section members joining the front ends of the front side frames and the sub-frame to each other in the vehicle up-down direction, in which the sub-frame has a suspension cross member that is a closed cross section member joining lower ends of the joint members to each other in the vehicle width direction and the shroud members are joined to upper surfaces and side surfaces of the front side frames.

According to the present disclosure, even when the suspension housings are provided in positions separated from the dash panel toward the vehicle front side, the body rigidity against the load acting on the front body can be improved.

Specifically, in the front body structure of the vehicle, the ring-shaped structural frame that is substantially ring-shaped in front view can be formed by the shroud upper, the left and right shroud members, the left and right joint members, and the suspension cross member of the sub-frame in a position on the vehicle front side of the suspension housings.

In addition, since the rear ends of the apron reinforcements and the rear ends of the front side frames are generally joined to the body frame that forms the vehicle interior of the vehicle, the front body structure of the vehicle can support the suspension housings via the body frame that forms the vehicle interior and the ring-shaped structural frame that is substantially ring-shaped in front view formed on the vehicle front side of the suspension housings.

Since the shroud members are joined to the upper surfaces and the side surfaces of the front side frames in the ring-shaped structural frame that is substantially ring-shaped in front view described above, the front body structure of the vehicle can improve the rigidity of the joint portions between the front side frames and the shroud members. Accordingly, the front body structure of the vehicle can improve the rigidity of the ring-shaped structural frame that is substantially ring-shaped in front view formed on the vehicle front side of the suspension housings.

Accordingly, the front body structure of the vehicle can improve the body rigidity against the load acting on the suspension housings and the load acting on the sub-frame. Accordingly, the front body structure of the vehicle can prevent the left and right apron reinforcements and front side frames from being bent and deformed in different directions when, for example, loads via the front suspension dampers act on the left and right suspension housings at different timings.

Accordingly, the front body structure of the vehicle can improve the body rigidity against the load acting on the front body even when the suspension housings are provided in positions separated from the dash panel toward the vehicle front side.

In an aspect of the present disclosure, the front side frames may have substantially planar plate members connected to the front ends of the front side frames and link members that separate, in the vehicle front-rear direction, internal spaces of the front side frames in substantially the same positions in the vehicle front-rear direction as rear ends of the joint members.

According to the present disclosure, the front body structure of the vehicle can join the closed cross sections of the shroud members and the closed cross sections of the joint members to each other by the closed cross sections of the front side frames formed by the plate members and the link members. Accordingly, the front body structure of the vehicle can further improve the rigidity of the body frame that connects the apron reinforcements and the sub-frame to each other.

Accordingly, the front body structure of the vehicle can improve the rigidity of the ring-shaped structural frame against, for example, turning moments acting on the suspension housings in front view or plan view or loads acting on the suspension housings in different timings Accordingly, the front body structure of the vehicle can further improve the body rigidity against the load acting on the front body by the plate member and the link members provided in the front side frames.

In addition, in an aspect of the present disclosure, the shroud members may have closed cross section parts that form closed cross sections together with the front side frames in a horizontal cross section along the vehicle width direction. According to the present disclosure, the front body structure of the vehicle can surely improve the continuity between the closed cross sections of the shroud members and the closed cross sections of the front side frames. Accordingly, the front body structure of the vehicle can further improve the rigidity of the joint portions between the front side frames and the shroud members.

Accordingly, the front body structure of the vehicle can further improve the rigidity of the ring-shaped structural frame that is substantially ring-shaped in front view formed on the front side of the suspension housings and can thereby improve the body rigidity against the load acting on the front body.

In an aspect of the present disclosure, the suspension housings may have damper mount parts to which the front suspension dampers are mounted and the apron reinforcements may be formed in a shape extending substantially linearly from rear ends thereof joined to hinge pillars toward the vehicle front side and an inner side in the vehicle width direction through an outer side in the vehicle width direction of the damper mount parts in plan view.

According to the present disclosure, the front body structure of the vehicle can obtain a larger space on the outer side in the vehicle width direction of the apron reinforcements in a position closer to the vehicle front side than in the apron reinforcements formed in a shape extending substantially linearly from the hinge pillars to the vehicle front side. Accordingly, the front body structure of the vehicle can prevent the shapes of, for example, a front fender and a head light from being limited by the apron reinforcements.

In addition, since the apron reinforcements extend substantially linearly from the rear ends thereof connected to the hinge pillars toward the vehicle front side and the inner side in the vehicle width direction, the front body structure of the vehicle can suppress the length in the vehicle width direction of the ring-shaped structural frame that is substantially ring-shaped in front view and therefore improve the rigidity of the ring-shaped structural frame that is substantially ring-shaped in front view.

In addition, the front body structure of the vehicle can make the apron reinforcements closer to the front suspension dampers provided in desired positions than in the apron reinforcements formed in a shape extending from the rear ends thereof toward the vehicle front side substantially linearly.

In other words, the front body structure of the vehicle can make the distance in the vehicle width direction between the damper mount parts of the suspension housings and the apron reinforcements smaller than in the apron reinforcements extending from the rear ends thereof toward the vehicle front substantially linearly.

Accordingly, the front body structure of the vehicle can achieve the size and weight reduction and the high rigidity of the suspension housings and suppress the bending moments acting on the joint portions between the suspension housings and the apron reinforcements. Accordingly, the front body structure of the vehicle can suppress the suspension housings from falling and deforming to the inner side in the vehicle width direction when loads act on the suspension housings via the front suspension dampers.

Accordingly, the front body structure of the vehicle can improve the flexibility of a vehicle design and further improve the body rigidity against the load acting on the front body using the apron reinforcements having a shape extending toward the vehicle front side from the rear end and the inner side in the vehicle width direction in plan view.

According to the present disclosure, it is possible to provide the front body structure of the vehicle capable of improving the body rigidity against the load acting on the front body even when the suspension housings are provided in positions separately from the dash panel toward the vehicle front side.

DETAILED DESCRIPTION

An embodiment of the present disclosure will be described below with reference to the drawings.

A vehicle 1 according to the present embodiment is a vehicle having a ring-shaped structural frame that is substantially ring-shaped in a front body on the vehicle front side of the vehicle interior in which occupants get on and off. The front body structure of the vehicle 1 will be described with reference to FIGS. 1 to 22.

Figure 1:
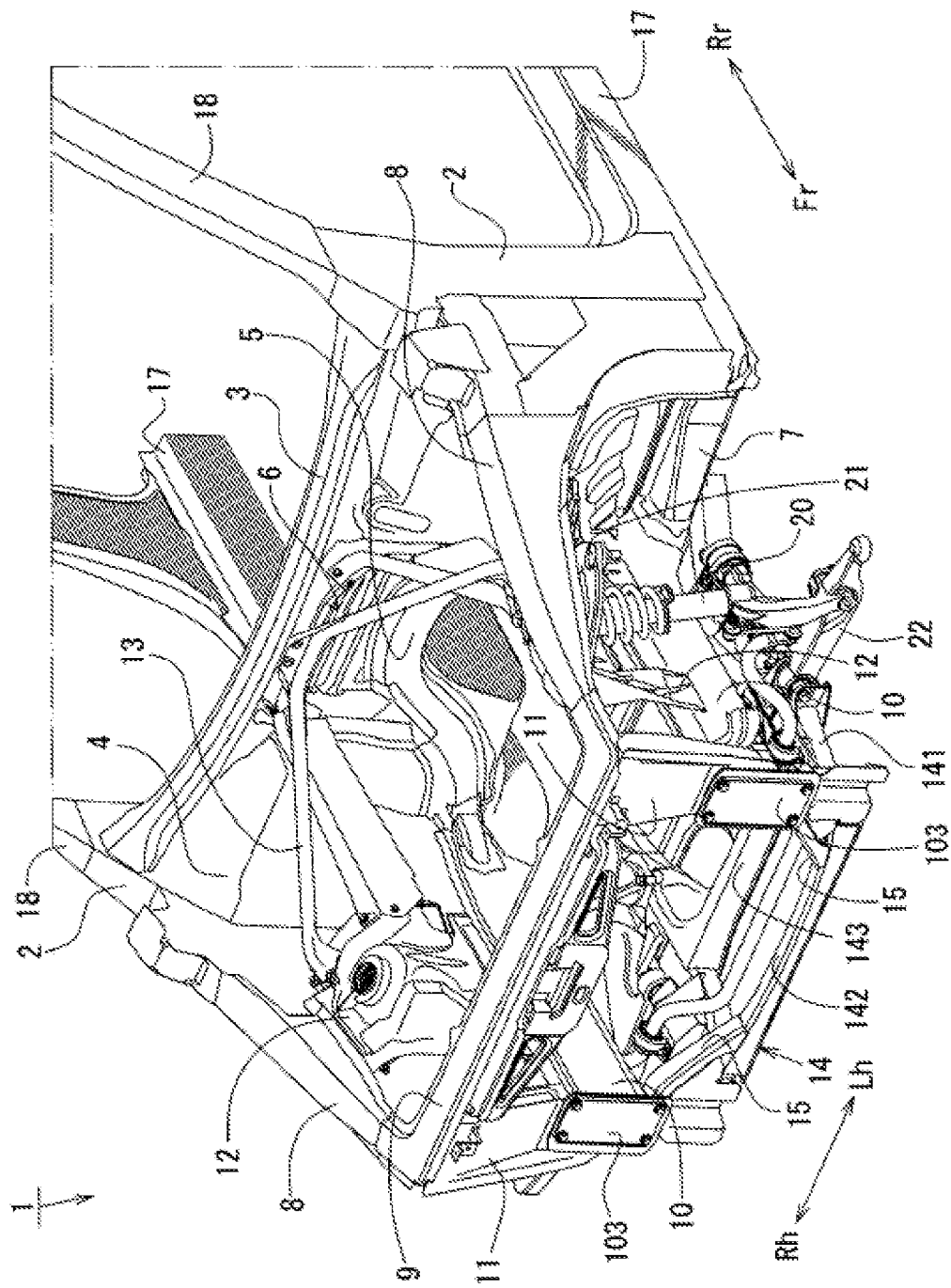
FIG. 1 is an appearance perspective view illustrating an external appearance of a front body seen from the upper front of a vehicle.
Figure 2:
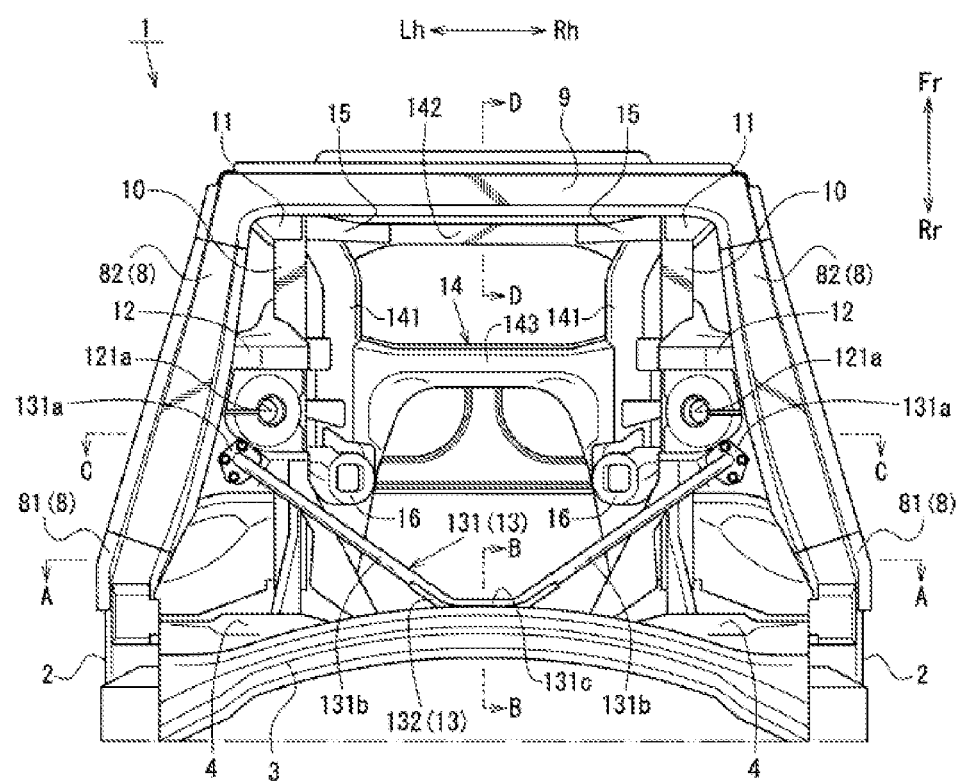
FIG. 2 is a plan view illustrating the external appearance of the front body seen from directly above.
Figure 3:
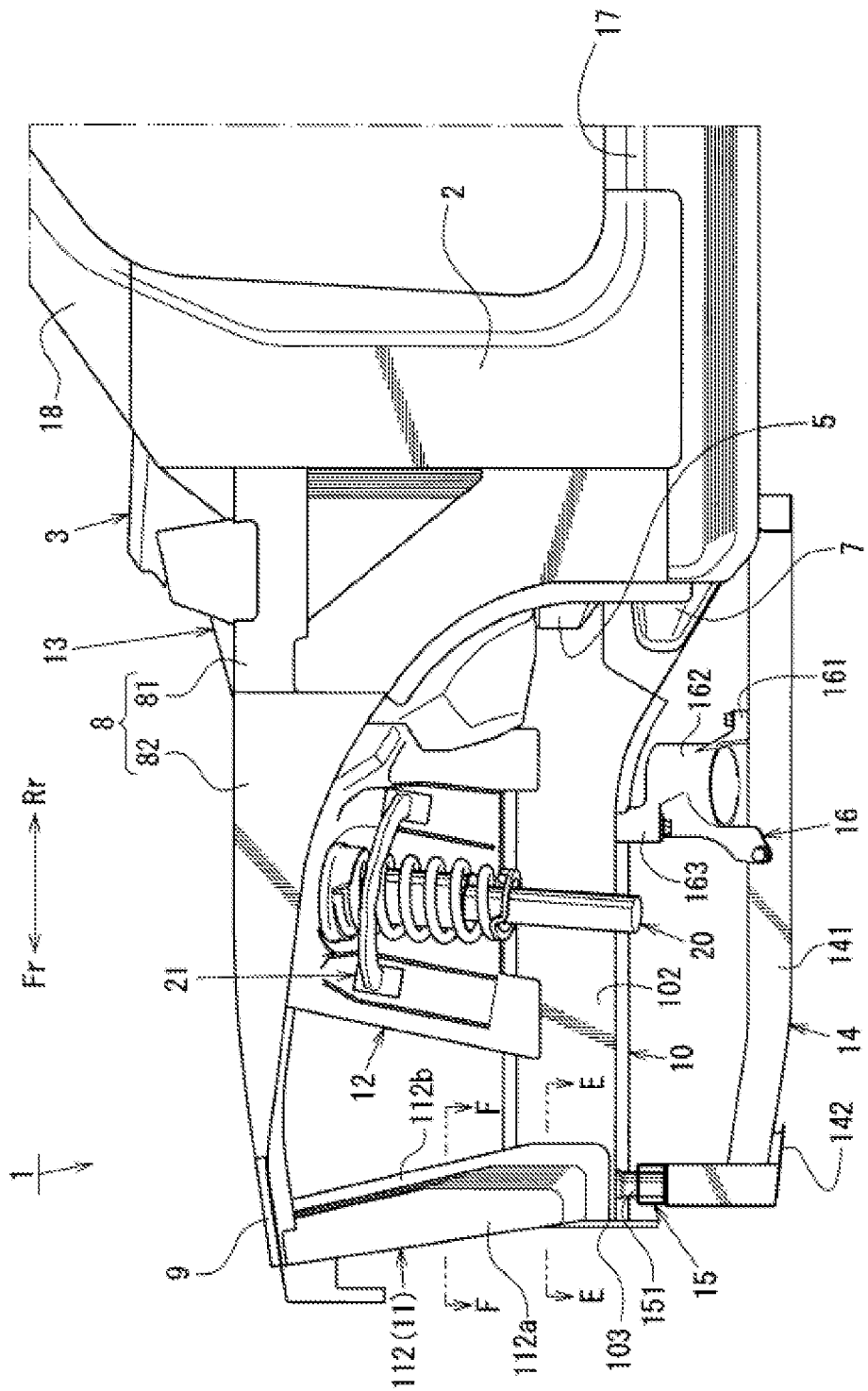
FIG. 3 is a left side view illustrating the external appearance of the front body seen from the left side.
Figure 4:
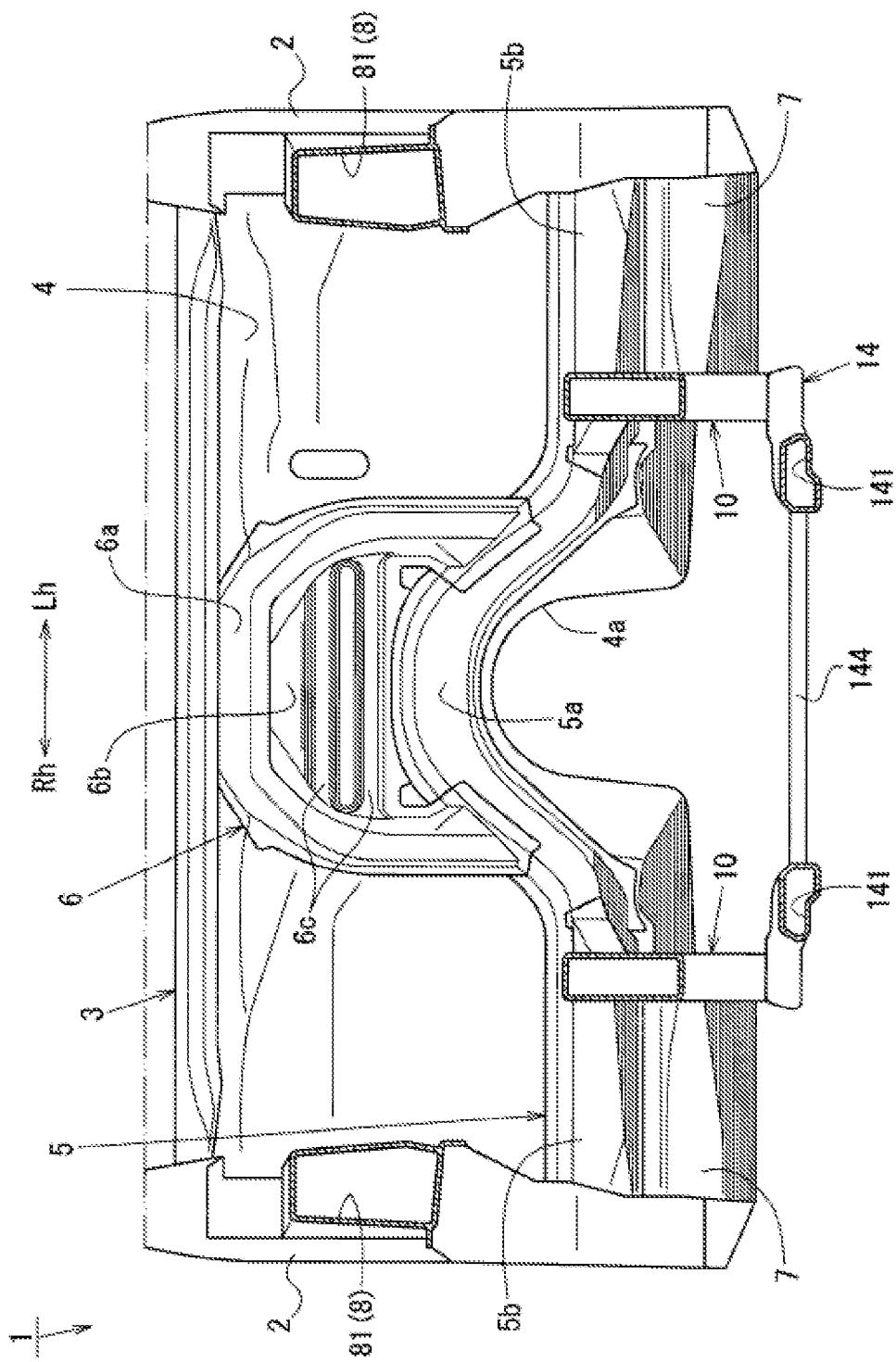
FIG. 4 is a cross sectional view seen along arrows A-A in FIG. 2.
Figure 5:
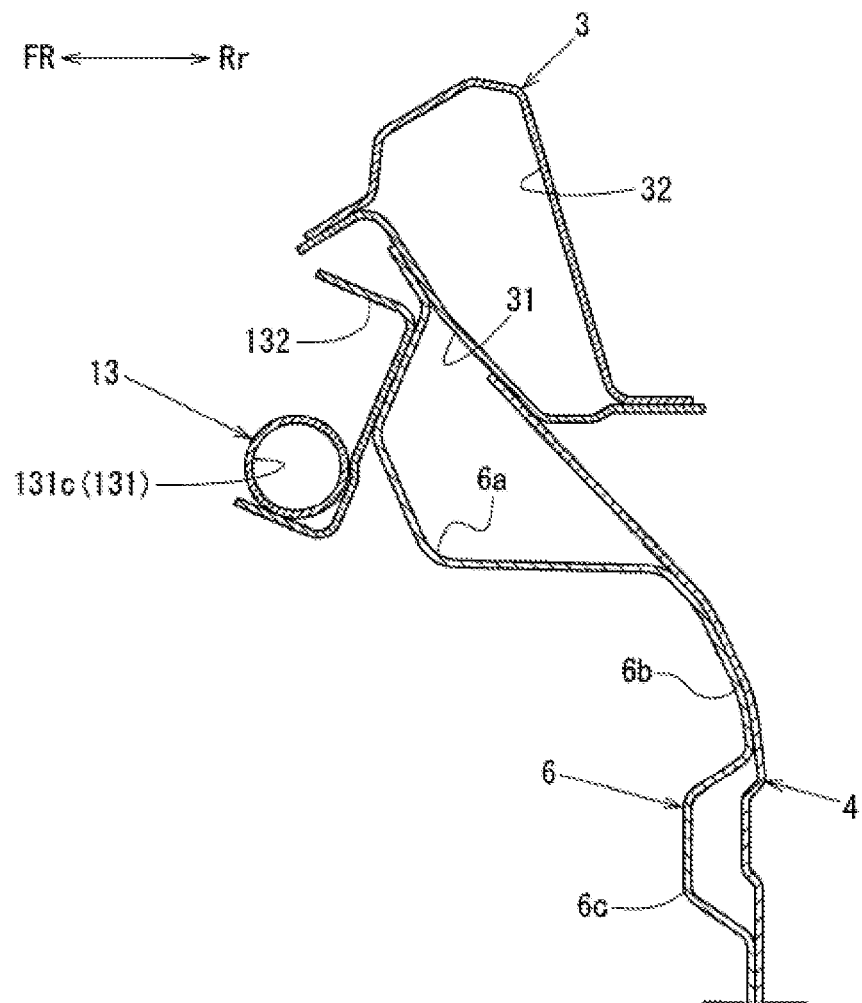
FIG. 5 is a cross sectional view seen along arrows B-B in FIG. 2.
Figure 6:
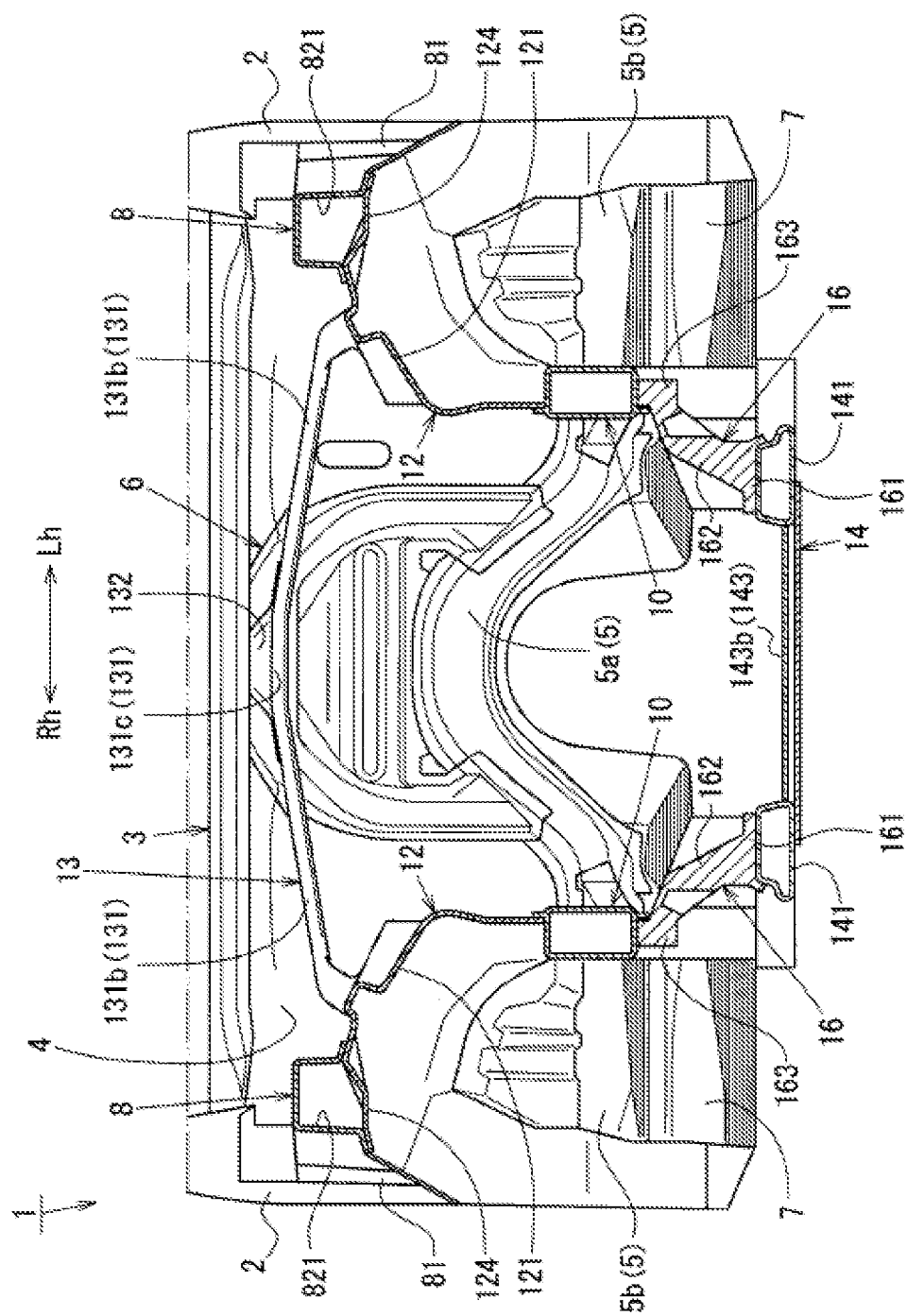
FIG. 6 is a cross sectional view seen along arrows C-C in FIG. 2.
Figure 7:
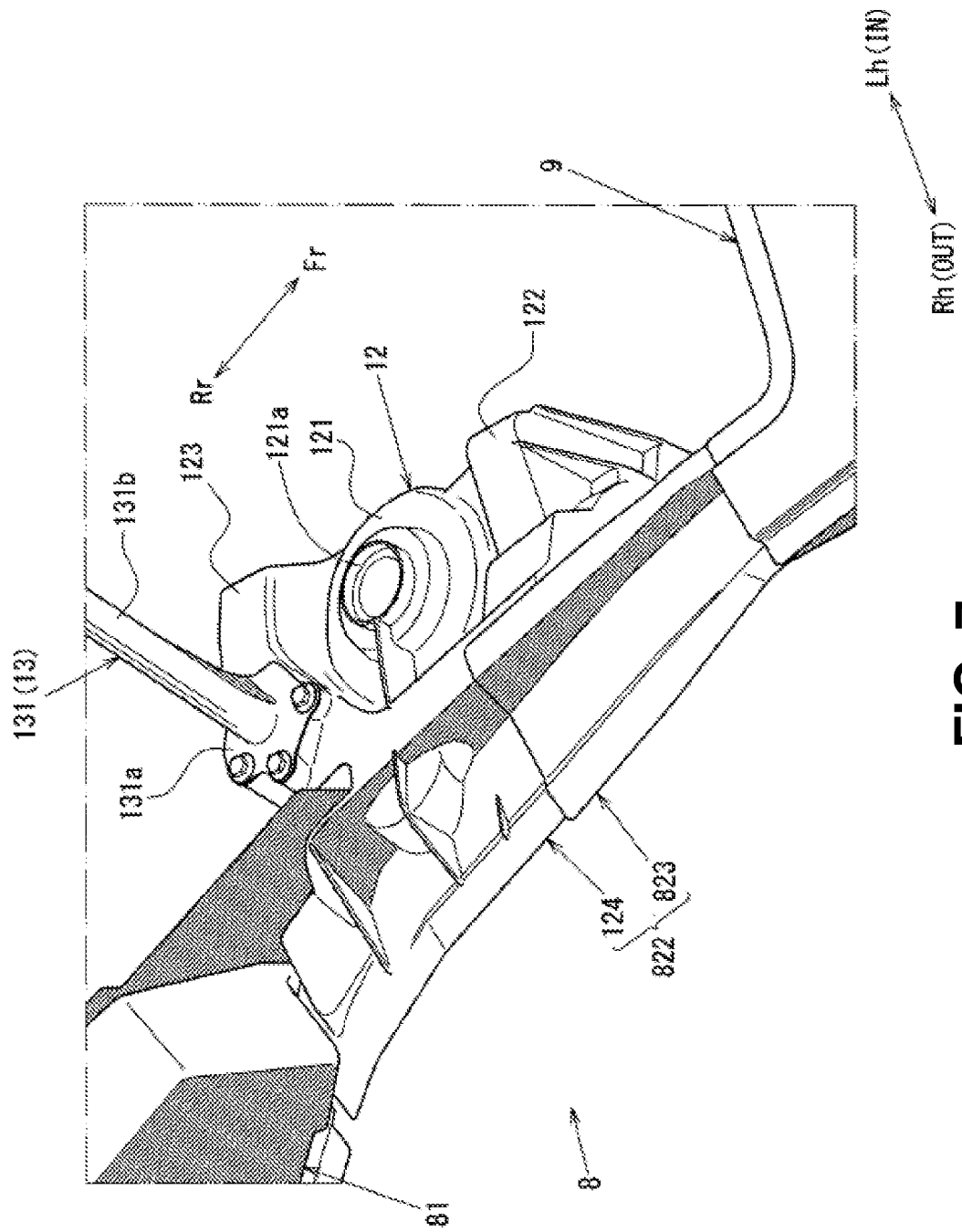
FIG. 7 is an appearance perspective view illustrating an apron reinforcement lower seen from the upper front of the vehicle.
Figure 8:
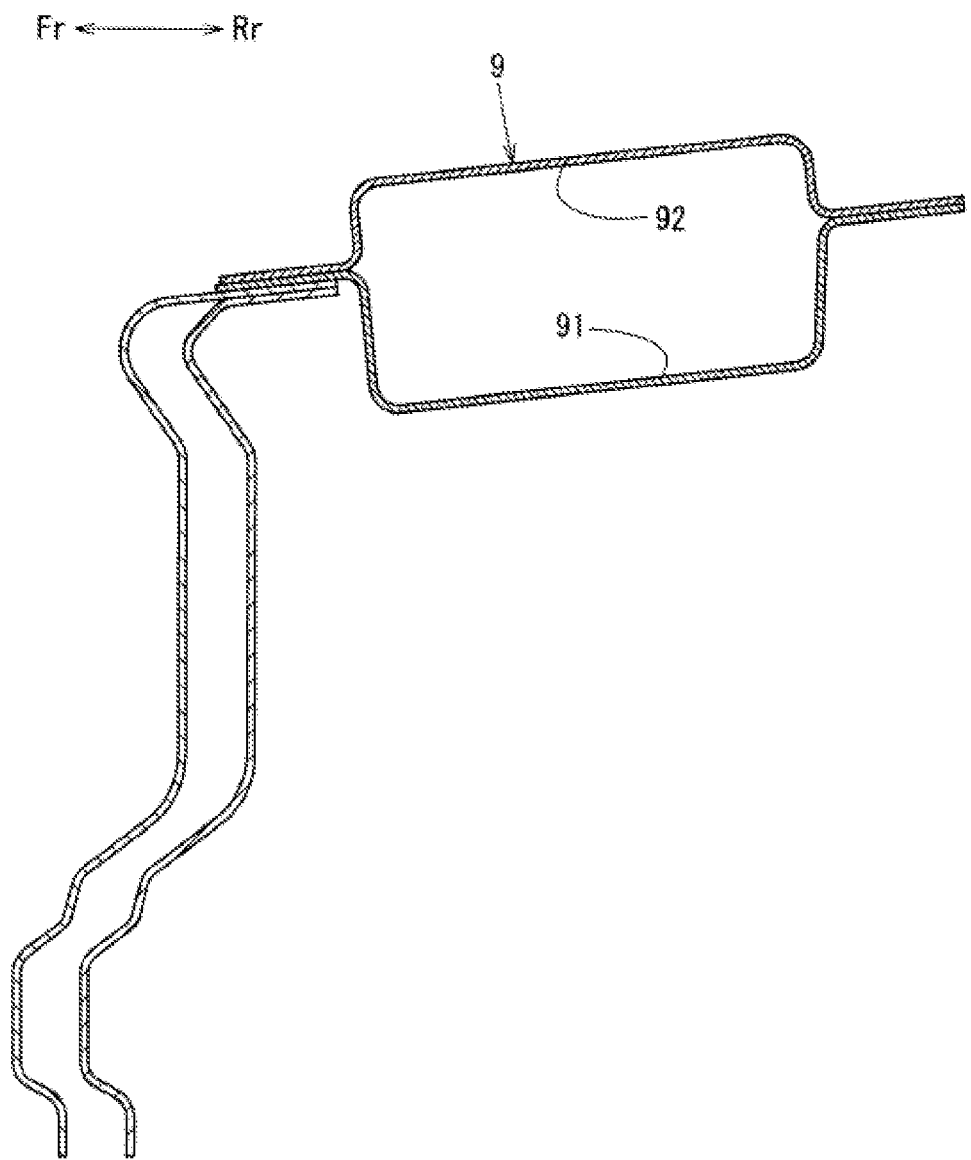
FIG. 8 is a cross sectional view seen along arrows D-D in FIG. 2.
Figure 9:
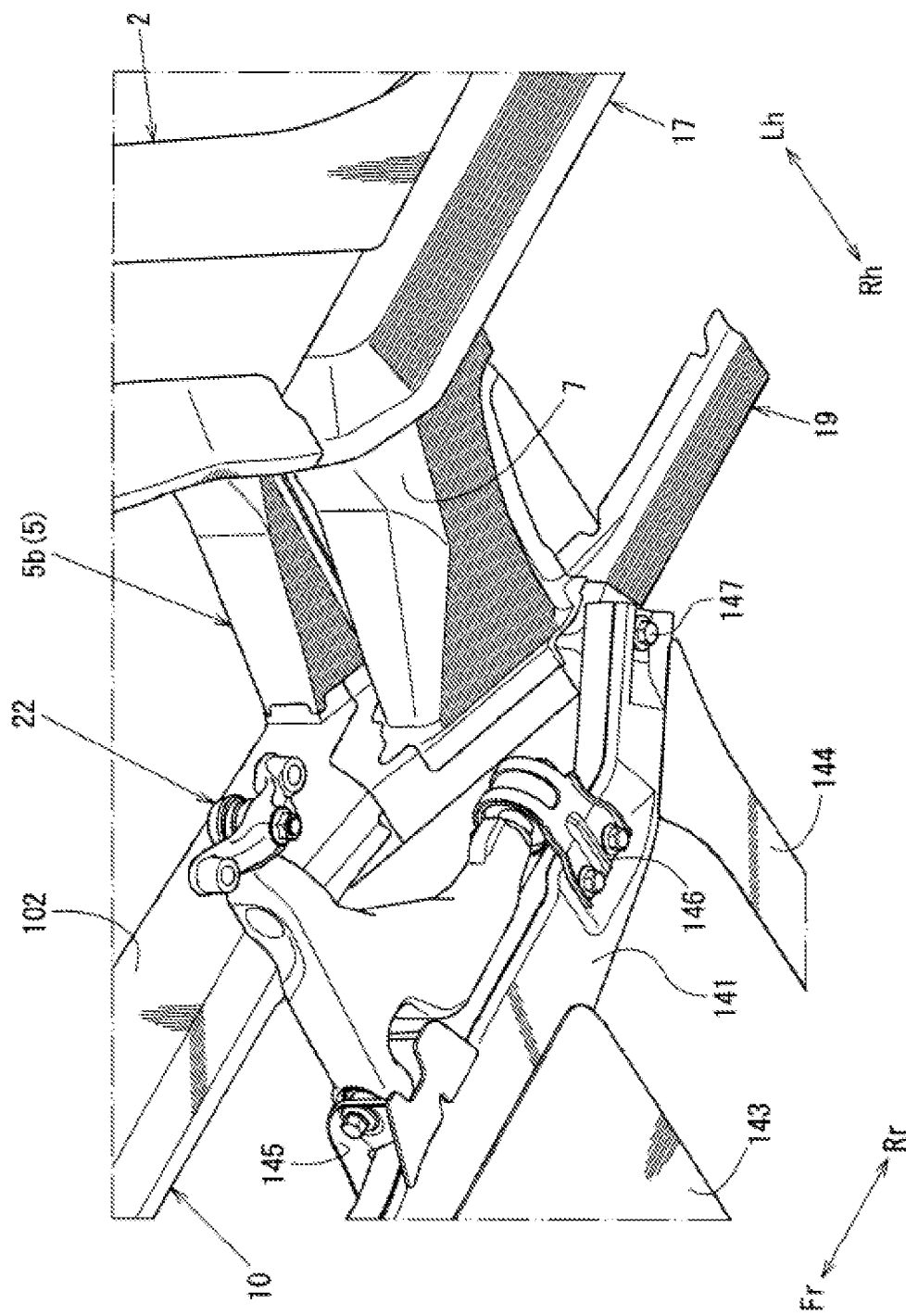
FIG. 9 is an appearance perspective view illustrating the rear end of a front side frame seen from the lower front of the vehicle.
Figure 10:
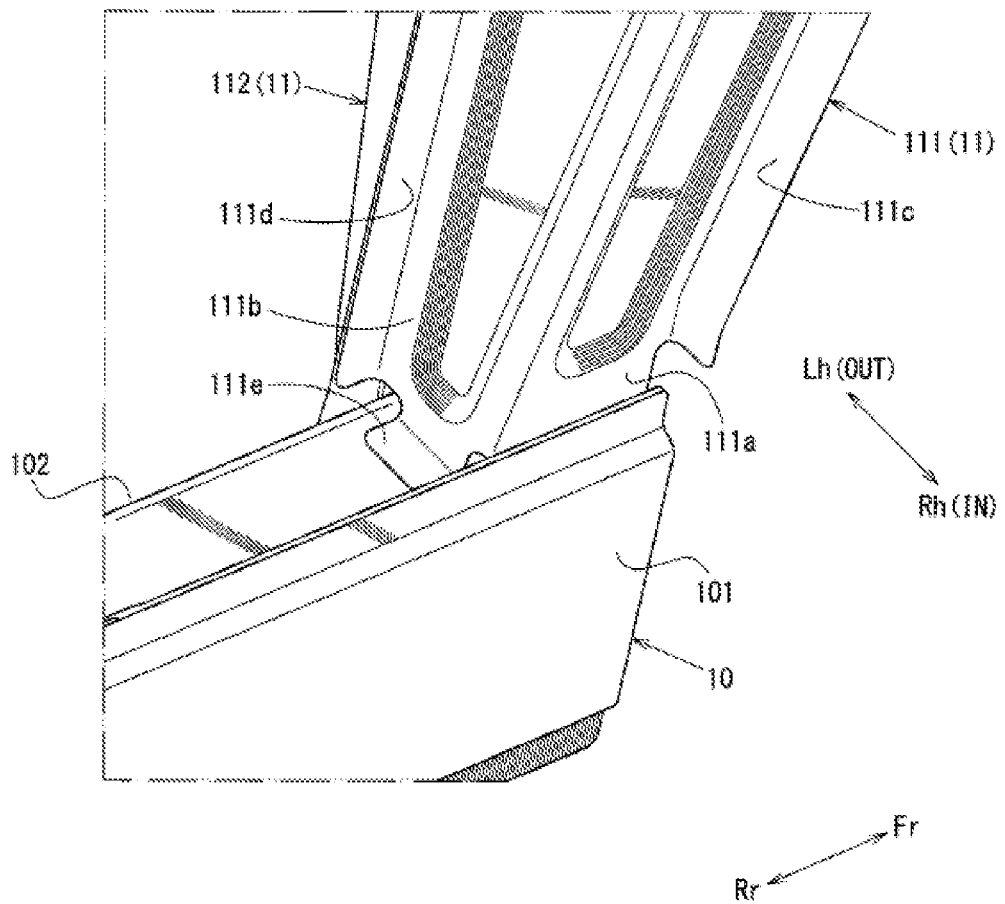
FIG. 10 is an appearance perspective view illustrating an inner side in a vehicle width direction in the vicinity of the front end of the front side frame.

It should be noted here that FIG. 1 is an appearance perspective view illustrating the front body seen from the upper front of the vehicle, FIG. 2 is a plan view illustrating the front body, FIG. 3 is a left side view illustrating the front body, FIG. 4 is a cross sectional view seen along arrows A-A in FIG. 2, FIG. 5 is a cross sectional view seen along arrows B-B in FIG. 2, FIG. 6 is a cross sectional view seen along arrows C-C in FIG. 2, FIG. 7 is an appearance perspective view illustrating an apron reinforcement lower 822 seen from the upper front of the vehicle, FIG. 8 is a cross sectional view seen along arrows D-D in FIG. 2, FIG. 9 is an appearance perspective view illustrating the rear end of a front side frame 10 seen from the lower front of the vehicle, and FIG. 10 is an appearance perspective view illustrating an inner side in a vehicle width direction in the vicinity of the front end of the front side frame 10.

Figure 11:
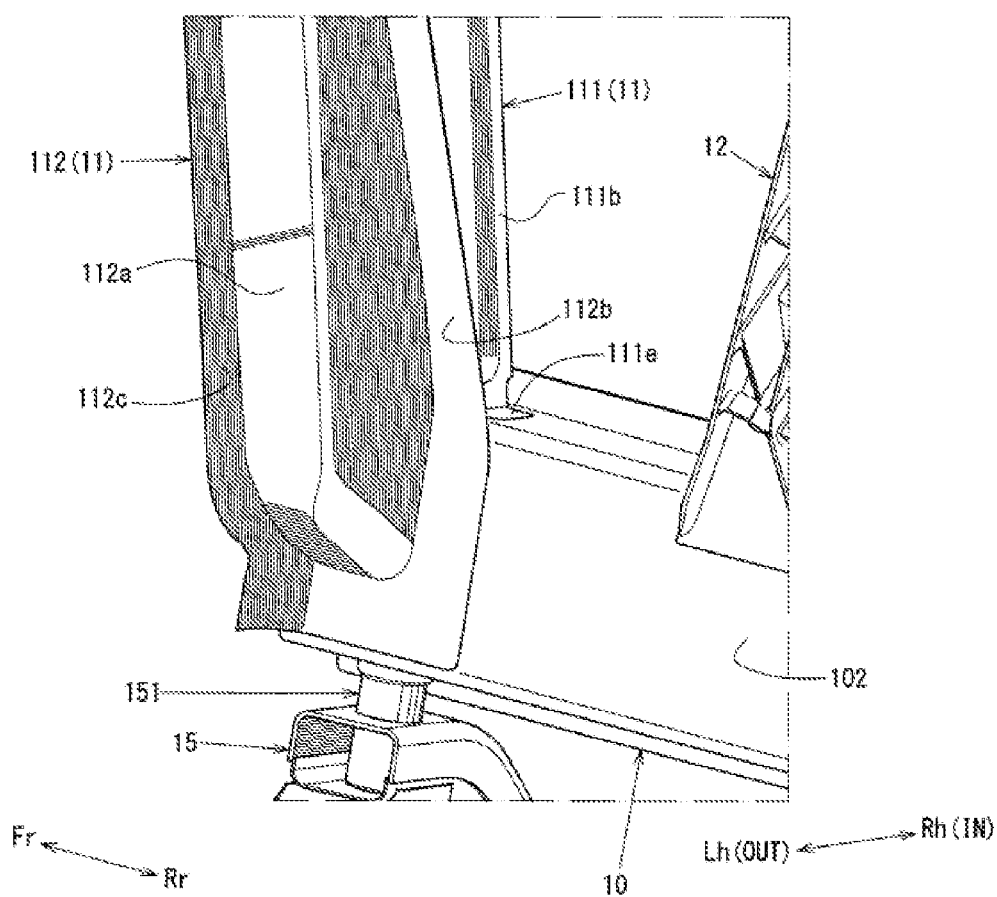
FIG. 11 is an appearance perspective view illustrating an outer side in the vehicle width direction in the vicinity of the front end of the front side frame.
Figure 12:
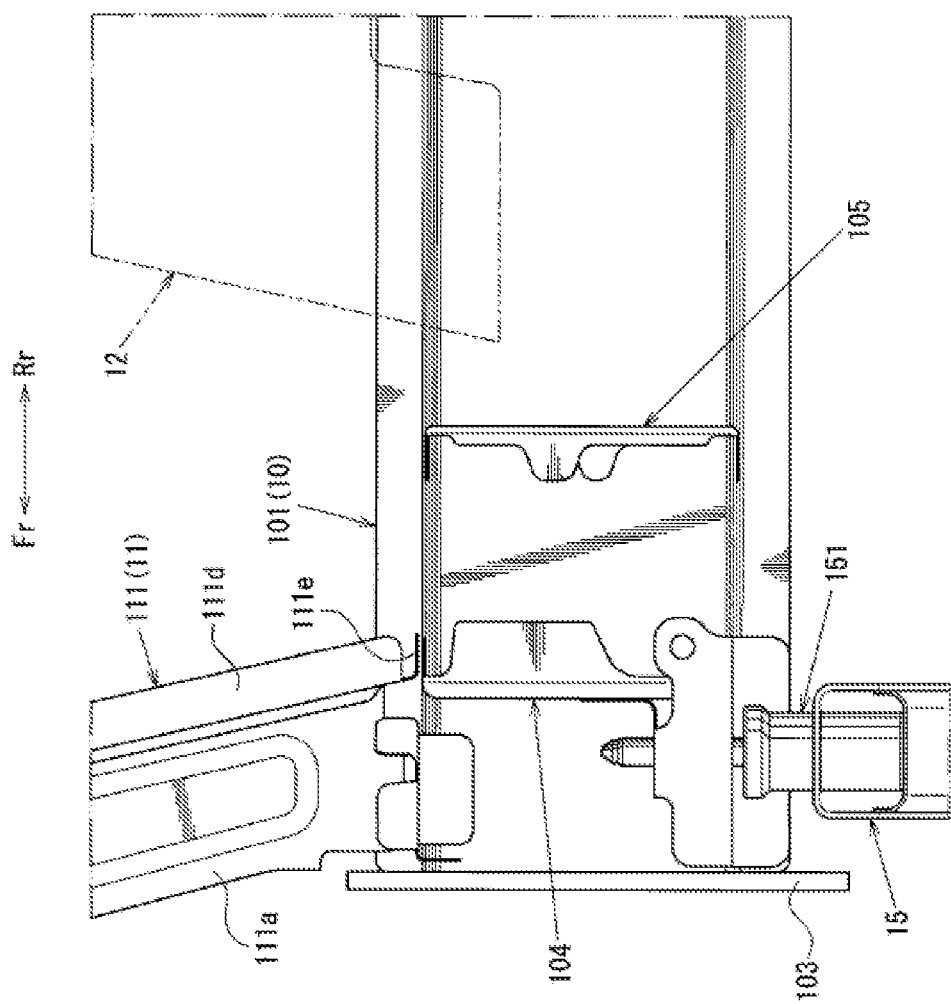
FIG. 12 is a left side view illustrating an internal structure in the vicinity of the front end of the front side frame seen from the left side.
Figure 13:
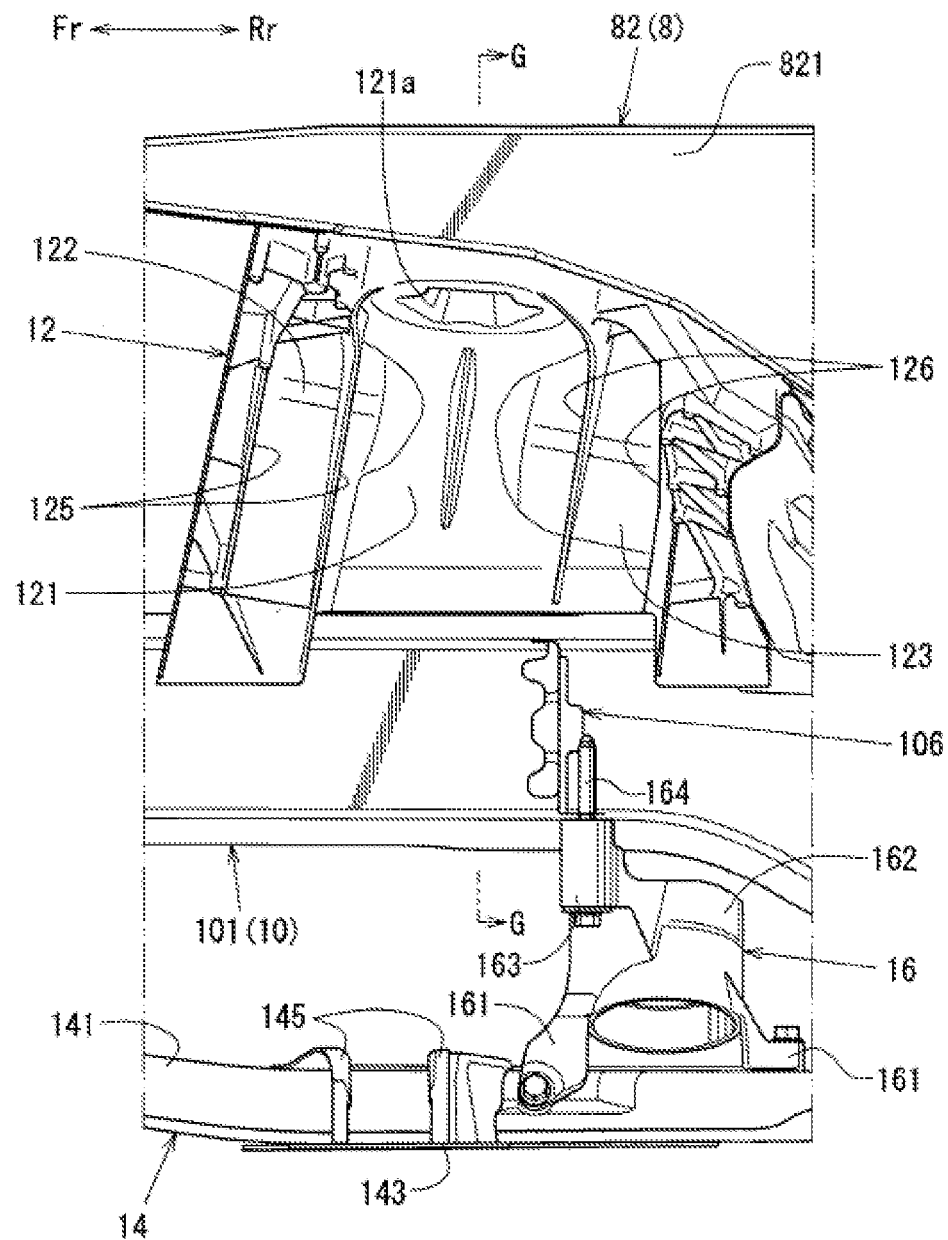
FIG. 13 is a left side view illustrating an internal structure of the front side frame in the vicinity of a suspension housing seen from the left side.
Figure 14:
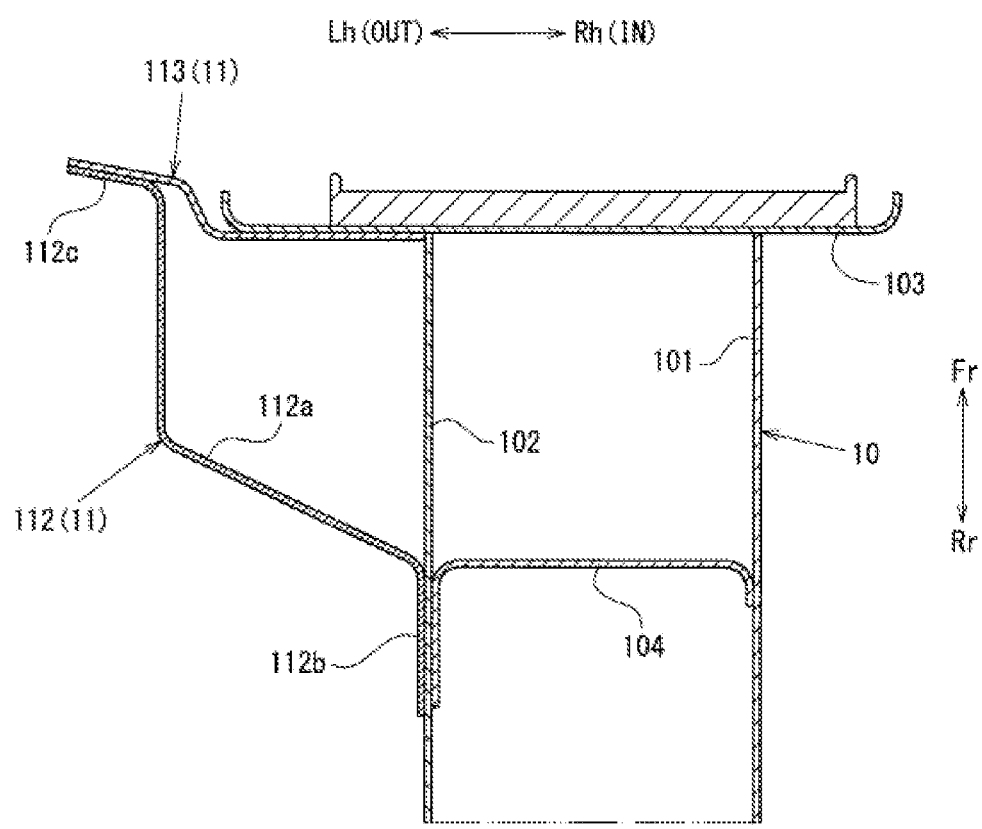
FIG. 14 is a cross sectional view seen along arrows E-E in FIG. 3.
Figure 15:
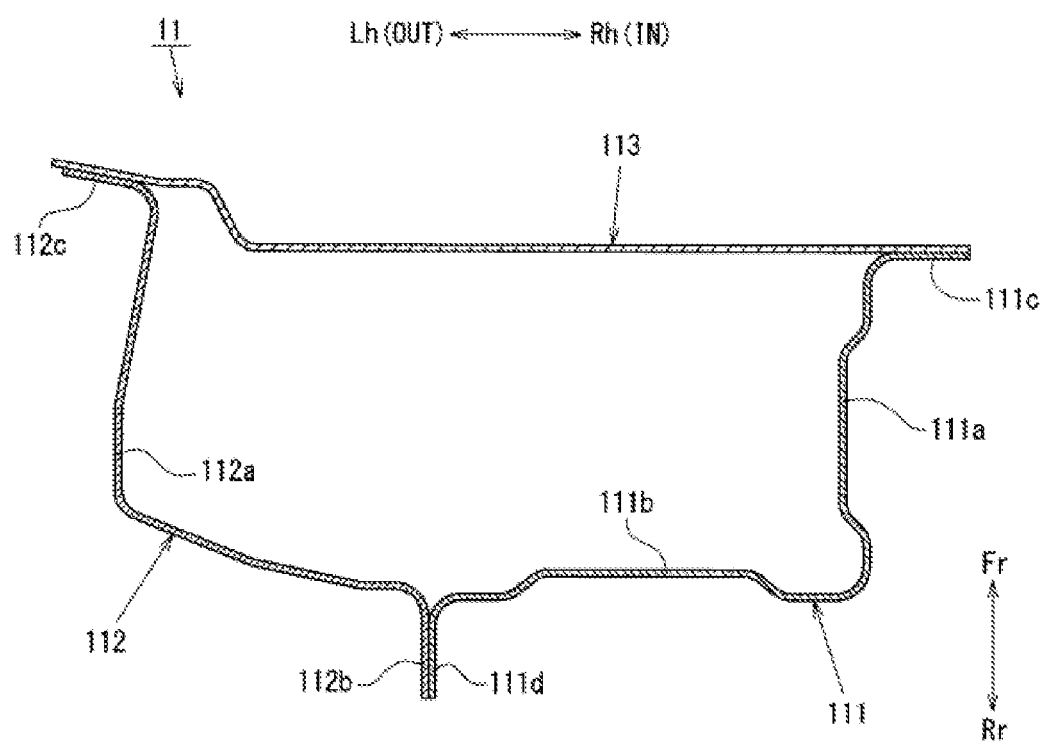
FIG. 15 is a cross sectional view seen along arrows F-F in FIG. 3.
Figure 16:
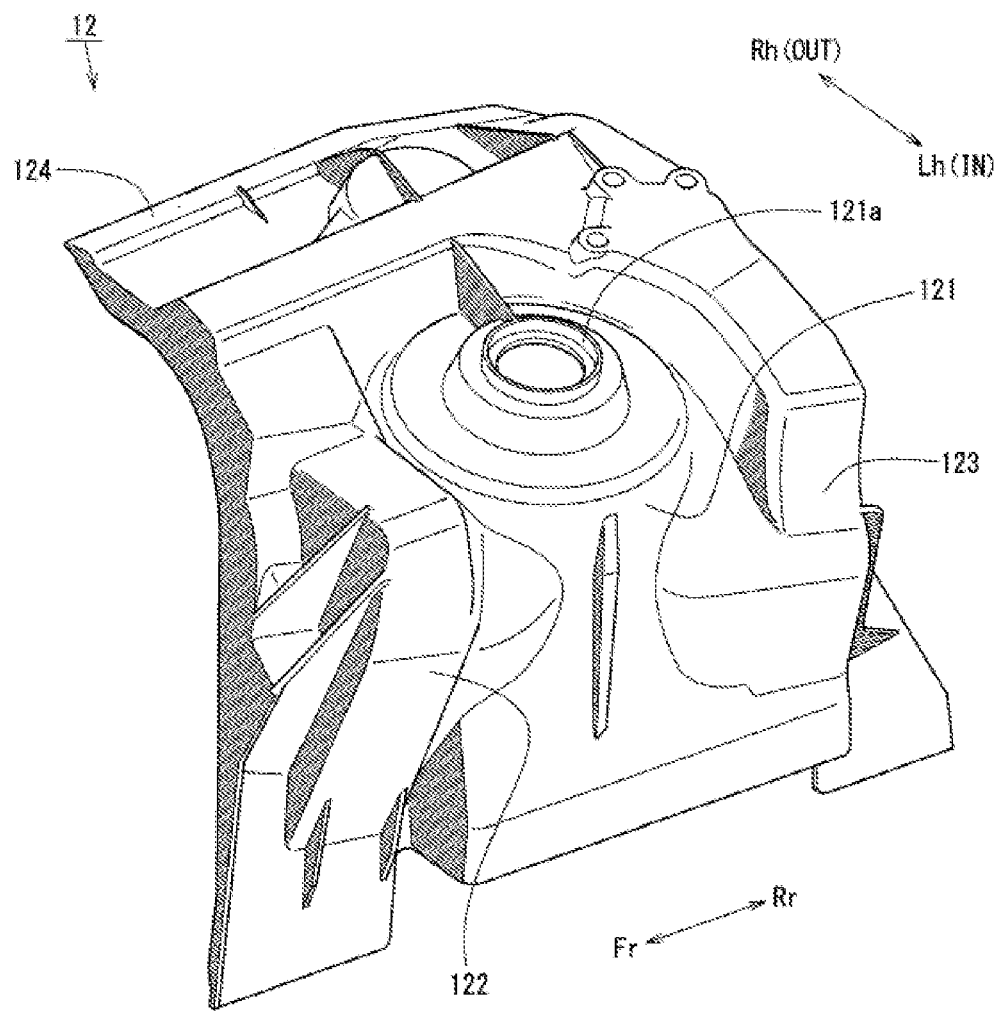
FIG. 16 is an appearance perspective view illustrating an external appearance of the suspension housing on the right side of the vehicle.

In addition, FIG. 11 is an appearance perspective view illustrating an outer side in the vehicle width direction in the vicinity of the front end of the front side frame 10, FIG. 12 is a left side view illustrating an internal structure in the vicinity of the front end of the front side frame 10, FIG. 13 is a left side view illustrating an internal structure of the front side frame 10 in the vicinity of a suspension housing 12, FIG. 14 is a cross sectional view seen along arrows E-E in FIG. 3, FIG. 15 is a cross sectional view seen along arrows F-F in FIG. 3, FIG. 16 is an appearance perspective view illustrating an external appearance of the suspension housing 12 on the right side of the vehicle.

Figure 17:
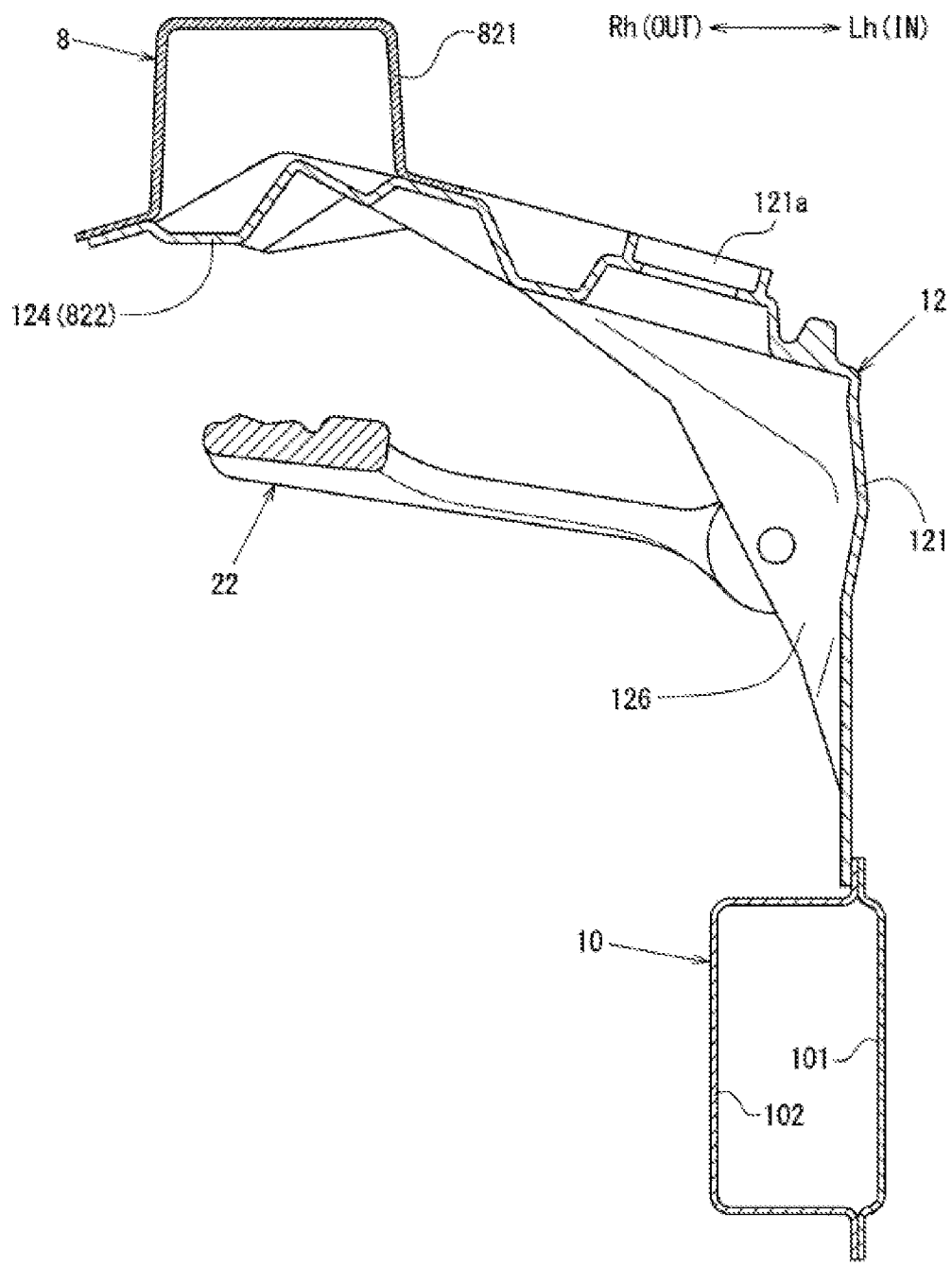
FIG. 17 is a cross sectional view seen along arrows G-G in FIG. 13.
Figure 18:
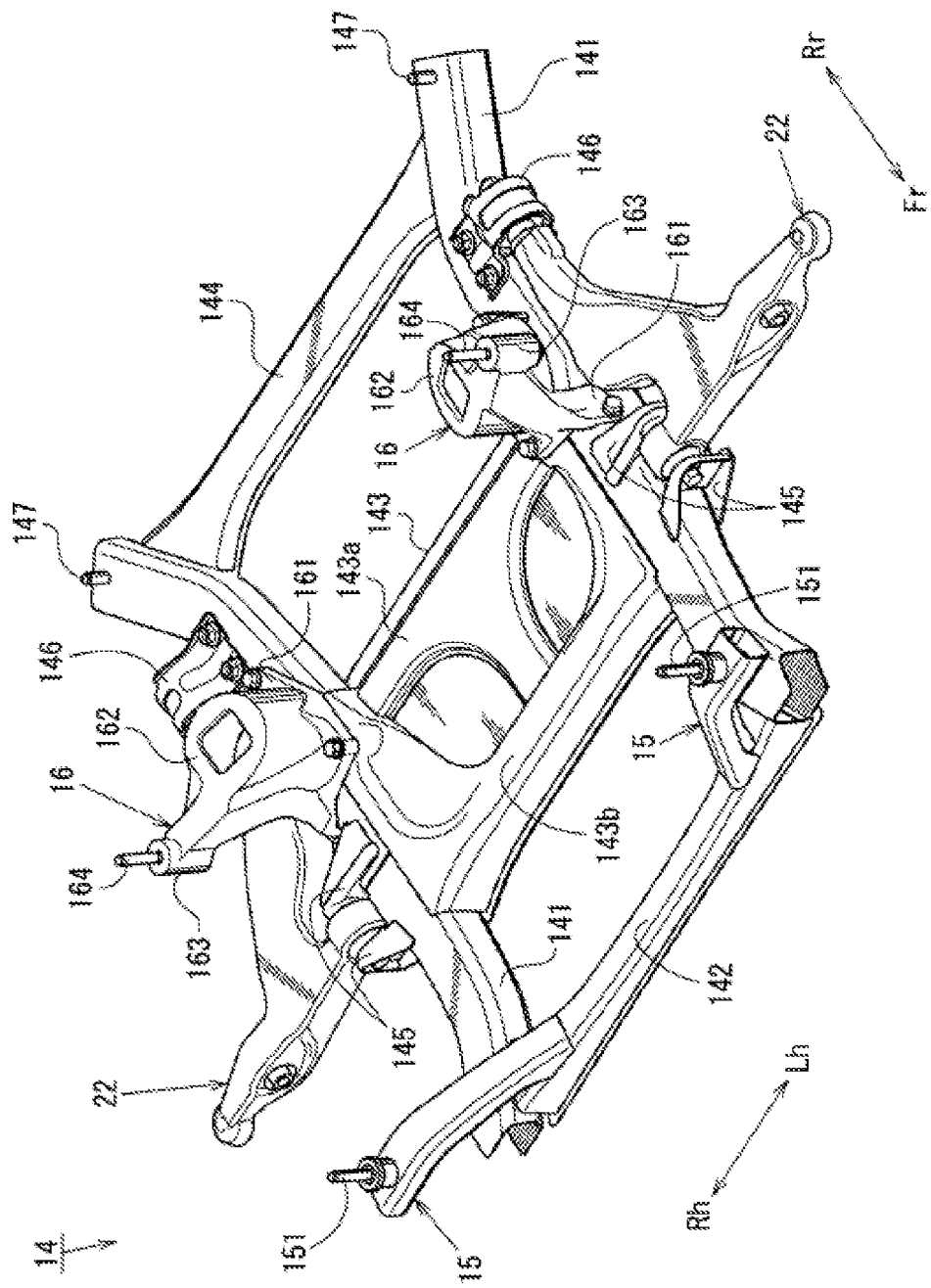
FIG. 18 is an appearance perspective view illustrating an external appearance of a sub-frame seen from the upper front of the vehicle.
Figure 19:
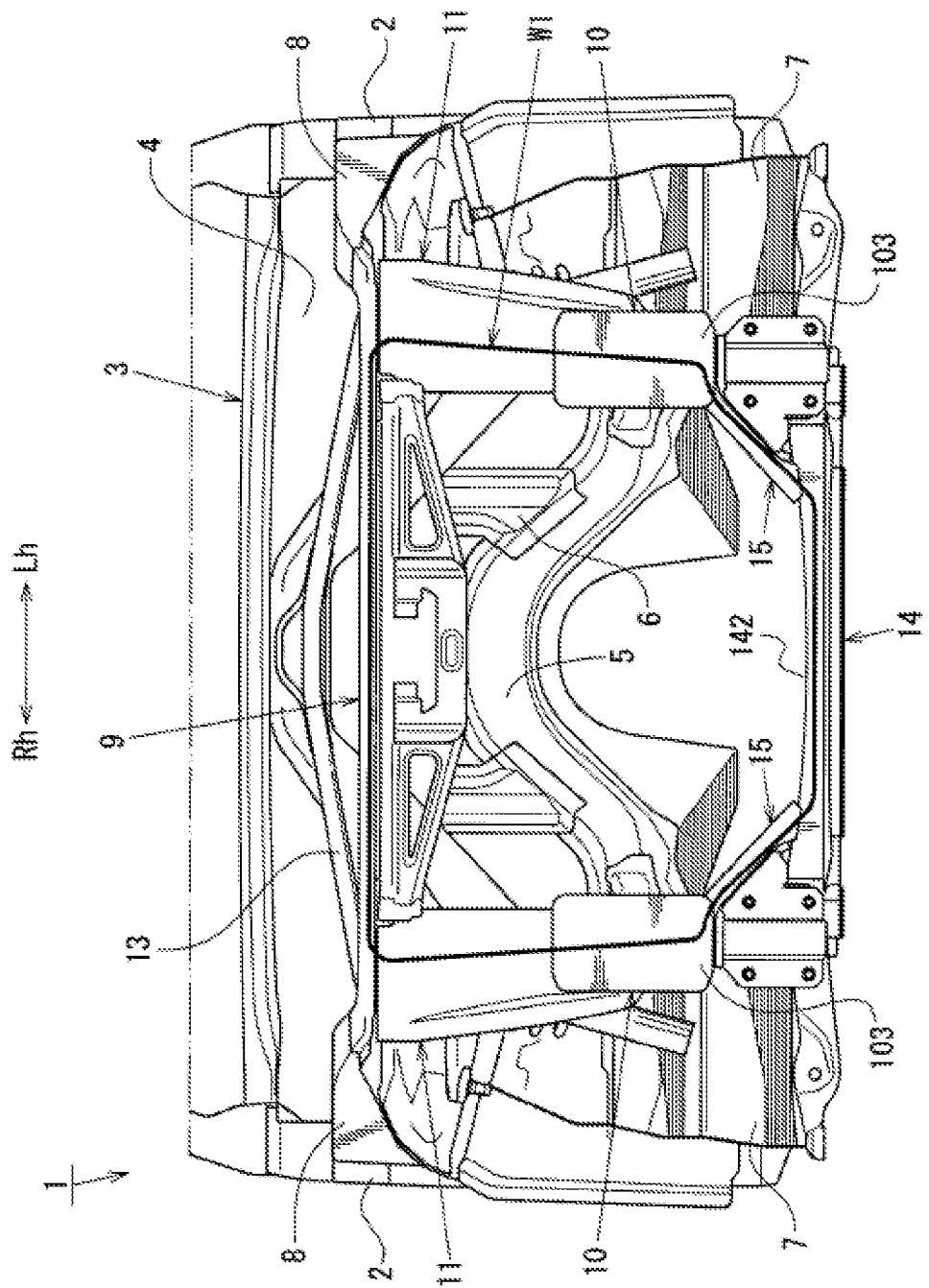
FIG. 19 is an explanatory diagram used to describe a first ring-shaped structural frame.
Figure 20:
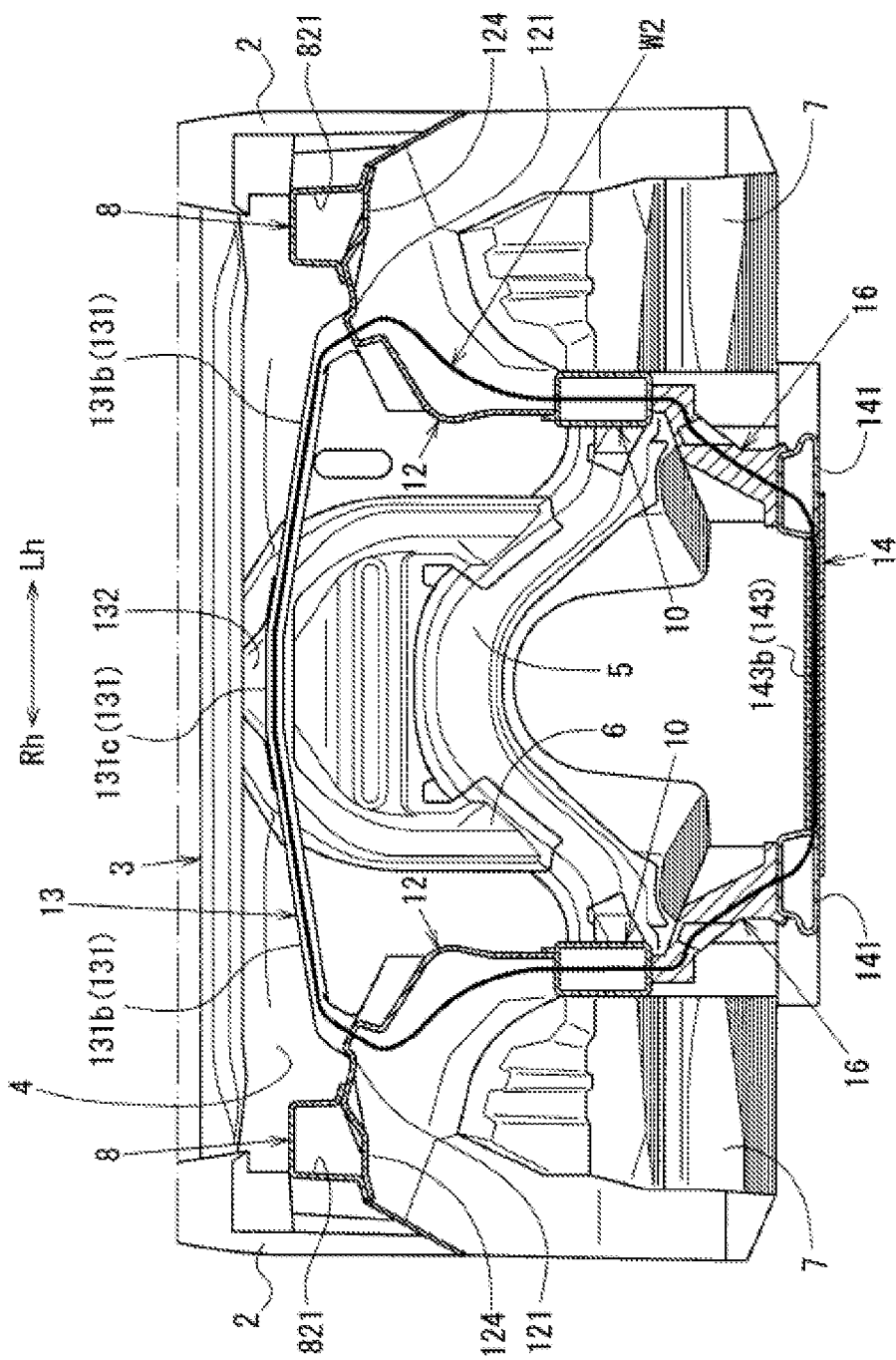
FIG. 20 is an explanatory diagram used to describe a second ring-shaped structural frame.
Figure 21:
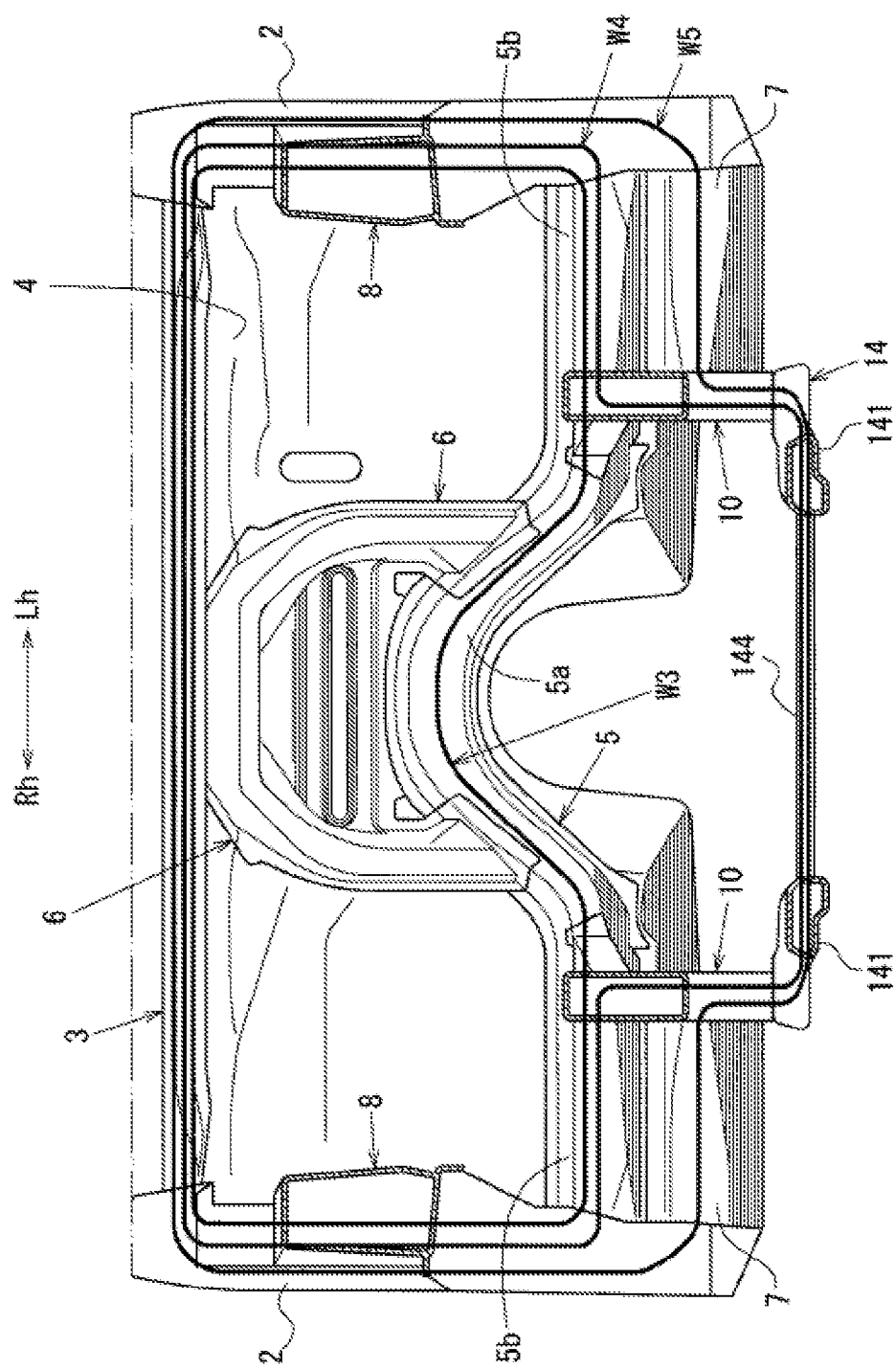
FIG. 21 is an explanatory diagram used to describe a third ring-shaped structural frame, a fourth ring-shaped structural frame, and a fifth ring-shaped structural frame.
Figure 22:
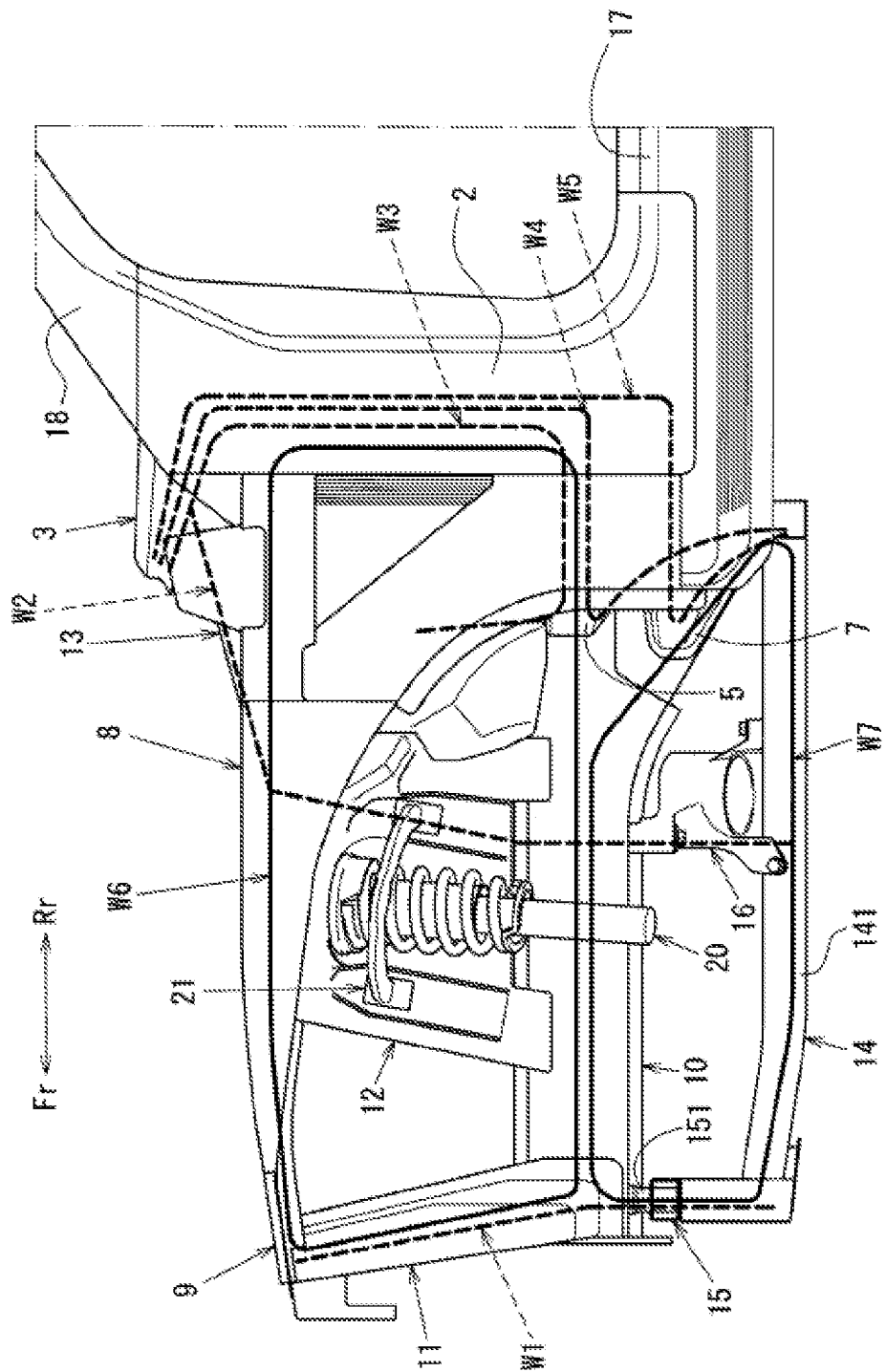
FIG. 22 is an explanatory diagram used to describe a sixth ring-shaped structural frame and a seventh ring-shaped structural frame.

Furthermore, FIG. 17 is a cross sectional view seen along arrows G-G in FIG. 13, FIG. 18 is an appearance perspective view illustrating an external appearance of a sub-frame 14 seen from the upper front of the vehicle, FIG. 19 is an explanatory diagram used to describe a first ring-shaped structural frame W1, FIG. 20 is an explanatory diagram used to describe a second ring-shaped structural frame W2, FIG. 21 is an explanatory diagram used to describe a third ring-shaped structural frame W3, a fourth ring-shaped structural frame W4, and a fifth ring-shaped structural frame W5, and FIG. 22 is an explanatory diagram used to describe a sixth ring-shaped structural frame W6 and a seventh ring-shaped structural frame W7.

In addition, to clarify illustration, a lower arm 22 is not illustrated in FIG. 3 and FIG. 22, a tower bar 13 is not illustrated in FIG. 4 and FIG. 21, and an apron reinforcement upper 821 is not illustrated in FIG. 7. In addition, a side frame outer 102 is not illustrated in FIG. 12 and FIG. 13 and a front suspension damper 20 is not illustrated in FIG. 18.

In addition, in these figures, arrows Fr and Rr indicate the front-rear direction, arrow Fr indicates the front side, and arrow Rr indicates the rear side. Furthermore, arrows Rh and Lh indicate the width direction, arrow Rh indicates the right direction, and arrow Lh indicates the left direction. In addition, arrow IN indicates the inner side in the vehicle width direction and arrow OUT indicates the outer side in the vehicle width direction.

As illustrated in FIG. 1 to FIG. 4, the front body of the vehicle 1 according to the present embodiment includes a pair of left and right hinge pillars 2 that extend in the vehicle up-down direction in positions separated from each other by a predetermined distance in the vehicle width direction, a cowl box 3 that joins the upper portions of the hinge pillars 2 in the vehicle width direction, a dash panel 4 provided between the hinge pillars 2, a dash cross member 5 that joins the lower portions of the hinge pillars 2 in the vehicle width direction, a reinforcing member 6 provided on the vehicle upper side of the dash cross member 5, and a pair of left and right torque boxes 7 provided on the vehicle lower side of the dash cross member 5.

As illustrated in FIG. 1 to FIG. 3, the front body of the vehicle 1 further includes a pair of left and right apron reinforcements 8 that extend from the upper portions of the hinge pillars 2 toward the vehicle front side, a shroud upper 9 that joins the front ends of the apron reinforcements 8 in the vehicle width direction, and the pair of left and right front side frames 10 that extend in the vehicle front-rear direction on the inner side in the vehicle width direction and on the vehicle lower side of the apron reinforcements 8.

As illustrated in FIG. 1 and FIG. 3, the front body of vehicle 1 further includes the shroud upper 9, a pair of left and right shroud members 11 that join the front ends of the front side frames 10 in a vehicle up-down direction, the hinge pillars 2, and the pair of left and right suspension housings 12 provided between the shroud members 11, the tower bar 13 that joins the left and right suspension housings 12, and the sub-frame 14 provided on the vehicle lower side of the front side frames 10.

As illustrated in FIG. 1 and FIG. 3, the front body of vehicle 1 has a pair of left and right front joint members 15 that join the front side frames 10 and the sub-frame 14 in substantially the same positions in the vehicle front-rear direction as the shroud members 11 and rear joint members 16 that connect the front side frames 10 and the sub-frame 14 in substantially the same positions in the vehicle front-rear direction as the suspension housings 12.

Subsequently, the components constituting the front body of the above vehicle 1 will be described in detail. As illustrated in FIG. 1 and FIG. 3, the hinge pillar 2 forms a lower portion of the vehicle interior and joins, in the vehicle up-down direction, the front end of a side sill 17, which is a closed cross section member extending in the vehicle front-rear direction, and the front end of a front pillar 18, which is a closed cross section member extending in the vehicle front-rear direction on the vehicle upper side of the side sill 17.

Although not described in detail, this hinge pillar 2 is a closed cross section member in which the cross sectional shape in a horizontal cross section along the vehicle front-rear direction is a closed cross section and includes a hinge pillar inner provided on the inner side in the vehicle width direction and a hinge pillar outer provided on the outer side in the vehicle width direction of the hinge pillar inner.

In addition, as illustrated in FIG. 2, the cowl box 3 is formed in a substantially arc shape in plan view in which substantially the middle thereof in the vehicle width direction projects toward the vehicle front side. This cowl box 3 is a closed cross section member in which the cross sectional shape in a vertical cross section along the vehicle front-rear direction is a closed cross section, as illustrated in FIG. 5, and includes a cowl lower 31 provided on the vehicle lower side and a cowl upper 32 that covers the cowl lower 31 from the vehicle upper side.

In addition, as illustrated in FIG. 1, FIG. 4 and FIG. 5, the dash panel 4 is a panel member that forms the front wall of the vehicle interior and both ends in the vehicle width direction are connected to the left and right hinge pillars 2, respectively, and the upper end is connected to the cowl lower 31 of the cowl box 3.

Furthermore, as illustrated in FIG. 4, the lower edge of the dash panel 4 in the vicinity of substantially the middle in the vehicle width direction is formed in a shape projecting toward the vehicle upward side like an inverted U shape along a floor tunnel (not illustrated) extending in the vehicle front-rear direction in the vehicle interior in front view. The lower edge formed in a shape along the floor tunnel is a tunnel correspondence portion 4a.

In addition, the dash cross member 5 connects the lower portions of the left and right hinge pillars 2 in the vehicle width direction along the lower edge of the dash panel 4 as illustrated in FIG. 4. Although not illustrated in detail, this dash cross member 5 is formed to have a substantially hat-shaped cross section projecting toward the vehicle front side so as to form a closed cross section together with the dash panel 4 in a vertical cross section along the vehicle front-rear direction.

More specifically, as illustrated in FIG. 4, the dash cross member 5 is formed integrally by a gate-shaped part 5a having a substantially gate shape in front view projecting toward the vehicle upper side along the tunnel correspondence portion 4a of the dash panel 4 in front view and a horizontal extending part 5b extending to the outside in the vehicle width direction toward the left and right hinge pillars 2 from the lower end of the gate-shaped part 5a.

In addition, as illustrated in FIG. 4, the reinforcing member 6 is provided on the vehicle upper side of the gate-shaped part 5a of the dash cross member 5 in plan view as a reinforcing member that reinforces the dash panel 4. The upper end of this reinforcing member 6 is connected to the cowl box 3 and the lower end thereof is connected to the gate-shaped part 5a of the dash cross member 5.

More specifically, as illustrated in FIG. 4, the reinforcing member 6 is formed integrally by a reinforcing member body 6a of a gate shape in front view that has an opening on the vehicle lower side and a flat plate part 6b of a substantially planar shape covering the portion surrounded by the reinforcing member body 6a.

As illustrated in FIG. 5, the reinforcing member body 6a is formed, in a vertical cross section along the vehicle front-rear direction, to have a cross sectional shape projecting toward the vehicle front side so as to form a closed cross section together with the cowl lower 31 of the cowl box 3 and the dash panel 4. As illustrated in FIG. 4 and FIG. 5, the flat plate part 6b is provided with two ribs 6c that project toward the vehicle front side and extend in the vehicle width direction so as to be separated from each other by a predetermined distance in the vehicle up-down direction.

In addition, as illustrated in FIG. 1 and FIG. 4, the torque box 7 is adjacent to the vehicle lower side of the horizontal extending part 5b of the dash cross member 5 and joins the side sill 17 and the front side frame 10 in the vehicle width direction. Although not illustrated in detail, this torque box 7 is formed with the dash panel 4 adjacent to the side sill 17 on the inner side in the vehicle width direction in a substantially box shape in which the cross sectional shape in a vertical cross section along the vehicle front-rear direction is a closed cross section.

In addition, as illustrated in FIG. 2, the apron reinforcements 8 are closed cross section members formed in a shape extending substantially linearly in the vehicle front-rear direction in plan view and the apron reinforcements 8 are provided so that the front ends thereof are positioned on the inner side in the vehicle width direction of the rear end thereof.

It should be noted here that the edges of the apron reinforcements 8 on the inner side in the vehicle width direction are formed in a substantially arc shape in plan view projecting toward the inner side in the vehicle width direction so that the tops thereof are positioned in substantially the same positions in the vehicle front-rear direction in plan view as damper mount parts 121a of the suspension housings 12, which will be described later.

More specifically, as illustrated in FIG. 1 and FIG. 3, each of the apron reinforcements 8 includes an apron reinforcement rear part 81 having the rear end connected to the upper part of the hinge pillar 2 and an apron reinforcement front part 82 connected to the apron reinforcement rear part 81.

As illustrated in FIG. 2 and FIG. 3, the apron reinforcement rear parts 81 are formed to have a length in the vehicle front-rear direction so that the front ends thereof are located in positions slightly closer to the vehicle rear side than the rear ends of the suspension housings 12, which will be described later. As illustrated in FIG. 5, this apron reinforcement rear parts 81 are formed so that the sectional shape in a vertical cross section along the vehicle width direction is a closed cross sectional shape.

As illustrated in FIG. 3, the apron reinforcement front parts 82 are formed in a shape having an upper surface that is substantially flat and a lower surface that is bent like a wheel arch in side view. As illustrated in FIG. 6 and FIG. 7, in the apron reinforcement front part 82, the cross sectional shape in the vertical cross section along the vehicle width direction is a substantially rectangular closed cross section. The apron reinforcement front part 82 includes the apron reinforcement upper 821 disposed on the vehicle upper side and the apron reinforcement lower 822 disposed on the vehicle lower side of the apron reinforcement upper 821.

Specifically, as illustrated in FIG. 6, the apron reinforcement uppers 821 are formed to have substantially hat-shaped cross sections, in the vertical cross section along the vehicle width direction, that projects toward the vehicle upper side. In contrast, as illustrated in FIG. 6 and FIG. 7, the apron reinforcement lowers 822 are formed to have substantially hat-shaped cross sections, in the vertical cross section along the vehicle width direction, that projects toward the vehicle lower side.

As illustrated in FIG. 7, each of the apron reinforcement lowers 822 is integrally formed by connecting, from the vehicle rear side, an apron reinforcement structural part 124 formed integrally with the suspension housing 12 and a lower panel 823 of steel formed in a shape continuous from the apron reinforcement structural part 124 in this order. It should be noted here that the apron reinforcement structural part 124 will be described in detail below.

In addition, as illustrated in FIG. 8, the shroud upper 9 is a closed cross section member in which the cross sectional shape in the vertical cross section along the vehicle front-rear direction is a closed cross section and includes a shroud lower panel 91 having a substantially hat-shaped cross section projecting toward the vehicle lower side and a shroud upper panel 92 having a substantially hat-shaped cross section projecting toward the vehicle upper side.

In addition, as illustrated in FIG. 3 and FIG. 9, the front side frames 10 are closed cross section members that have a length in the vehicle front-rear direction from the lower portion of the dash panel 4 to the front ends of the apron reinforcements 8. As illustrated in FIG. 9, the rear end of the front side frame 10 is connected to the range from the front end of a floor frame 19 that forms a closed cross section extending in the vehicle front-rear direction together with a floor panel (not illustrated) to the dash cross member 5. In addition, the inner side in the vehicle width direction of the torque box 7 is connected to the side surface on the outer side in the vehicle width direction of the front side frame 10.

More specifically, as illustrated in FIG. 6, FIG. 10, and FIG. 11, in the front side frame 10, the cross sectional shape in a vertical cross section along the vehicle width direction is a substantially rectangular closed cross section. The front side frame 10 includes a side frame inner 101 provided on the inner side in the vehicle width direction and the side frame outer 102 provided on the outer side in the vehicle width direction.

As illustrated in FIG. 10, the side frame inner 101 is formed in a shape obtained by extending, in the vehicle front-rear direction, a substantially hat-shaped open cross section projecting toward the inner side in the vehicle width direction. In contrast, as illustrated in FIG. 11, the side frame outer 102 is formed in a shape obtained by extending, in the vehicle front-rear direction, a substantially hat-shaped open cross section projecting toward the outer side in the vehicle width direction by a length in the vehicle width direction larger than the length in the vehicle width direction of the side frame inner 101.

As illustrated in FIG. 1, substantially planar plate members 103 which closes a frontend opening, and to which crash cans (not illustrated) are jointed are connected to the front side frames 10 described above.

In addition, as illustrated in FIG. 12 and FIG. 13, a first link member 104, a second link member 105, and a third link member 106 are provided in this order from the vehicle front side in the front side frame 10 so as to partition the internal space in positions separated at predetermined intervals in the vehicle front-rear direction.

As illustrated in FIG. 12 and FIG. 14, the first link member 104 is integrally formed by a substantially planar plate portion having a predetermined thickness in the vehicle front-rear direction and a flange portion extending like a flange shape from the edge of the plate portion.

As illustrated in FIG. 12 and FIG. 14, the first link member 104 is provided in substantially the same position in the vehicle front-rear direction as the rear portion of the lower end of the shroud member 11, which will be described later, and is connected to the inner surface of the front side frame 10. Therefore, a closed cross section space continuous with the shroud member 11, which will be described later, is formed in the front side frame 10 by the plate member 103 and the first link member 104.

As illustrated in FIG. 12, the second link member 105 is integrally formed by a substantially planar plate portion having a predetermined thickness in the vehicle front-rear direction and a flange portion extending like a flange shape from the edge of the plate portion. The second link member 105 is provided in a position separated from the first link member 104 toward the vehicle rear side by a predetermined distance.

As illustrated in FIG. 13, the third link member 106 is integrally formed by a substantially planar plate portion having a predetermined thickness in the vehicle front-rear direction and a flange portion extending like a flange shape from the edge of the plate portion. The third link member 106 is connected to the inner surface of the front side frame 10 so as to join a rear reinforcing part 123 of the suspension housing 12 described later and the rear joint member 16 described later in the vehicle up-down direction, as illustrated in FIG. 13.

In addition, as illustrated in FIG. 10, FIG. 11, and FIG. 15, the shroud member 11 is a closed cross section member in which the cross sectional shape in a horizontal cross section along the vehicle front-rear direction is a substantially rectangular closed cross section and includes an inner side surface structural part 111 provided on the inner side in the vehicle width direction, an outer side surface structural part 112 provided on the outer side in the vehicle width direction of the inner side surface structural part 111, and a front surface structural part 113 provided on the vehicle front side of the inner side surface structural part 111.

Specifically, as illustrated in FIG. 10 and FIG. 15, the inner side surface structural part 111 is integrally formed by an inner side surface portion 111a that is a side surface on the inner side in the vehicle width direction of the shroud member 11, a rear surface portion 111b that is a rear surface of the shroud member 11, a front side flange portion 111c extending from the front end of the inner side surface portion 111a toward the outer side of the vehicle width direction, a rear side flange portion 111d extending from the outer side in the vehicle width direction of the rear surface portion 111b toward the vehicle rear side, and a lower side flange portion 111e extending from lower end of the rear surface portion 111b toward the vehicle rear side.

In this inner side surface structural part 111, as illustrated in FIG. 10 and FIG. 12, the lower end of the inner side surface portion 111a is connected to the flange portion of the side frame outer 102 and the lower flange portion 111e is connected to the first link member 104 via the upper surface of the side frame outer 102.

As illustrated in FIG. 11 and FIG. 15, the outer side surface structural part 112 is integrally formed by a raised portion 112a that is raised to the outer side in the vehicle width direction of the side surface on the outer side in the vehicle width direction of the side frame outer 102, a rear side flange portion 112b provided like a substantially flange shape along the lower edge and rear edge of the raised portion 112a, and a front side flange portion 112c that extends toward the outer side in the vehicle width direction from the front edge of the raised portion 112a.

The raised portion 112a of the outer side surface structural part 112 is formed to have a length in the vehicle up-down direction from the upper end to the side surface of the front side frames 10. In addition, in the outer side surface structural part 112, the lower portion of the rear side flange portion 112b is connected to the side frame outer 102, the rear portion of the rear side flange portion 112b is connected to the rear side flange portion 111d of the inner side surface structural part 111, and the front side flange portion 112c is connected to the front surface structural part 113.

As illustrated in FIG. 10, FIG. 11, FIG. 14, and FIG. 15, the front surface structural part 113 is a substantially planar plate shape that has a predetermined thickness in the vehicle front-rear direction and closes an opening on the vehicle front side formed by the inner side surface structural part 111 and the outer side surface structural part 112.

As illustrated in FIG. 14 and FIG. 15, in the horizontal cross section along the vehicle front-rear direction, the shroud member 11 forms a closed cross section with the inner side surface structural part 111, the outer side surface structural part 112, and the front surface structural part 113 on the vehicle upper side of the upper surface of the front side frames 10 and forms a closed cross section with the outer side surface structural part 112, the front surface structural part 113, and the side surface of the front side frame 10 on the vehicle lower side of the upper surface of the front side frames 10.

That is, the shroud member 11 forms a closed cross section space adjacent to the closed cross section space of the front side frame 10 separated by the plate member 103 and the first link member 104 by causing the outer side surface structural part 112 and the front surface structural part 113 to form a closed cross section part having a closed cross section together with the front side frame 10.

In addition, as illustrated in FIG. 1 and FIG. 3, the suspension housings 12 are high rigidity members that swingably support the hinge pillars 2, the upper ends of the front suspension dampers 20 provided in desired positions on the vehicle front side of the dash panel 4 toward the vehicle front side, an upper arm 21 and the suspension housings 12 are provided across the apron reinforcements 8 and the front side frames 10.

More specifically, as illustrated in FIG. 3 and FIG. 16, the suspension housings 12 are integrally formed by suspension towers 121 to which the upper ends of the front suspension dampers 20 are attached, front side reinforcing parts 122 adjacent to the vehicle front side of the suspension towers 121, the rear reinforcing parts 123 adjacent to the vehicle rear side of the suspension towers 121, and the apron reinforcement structural parts 124 that are parts of the apron reinforcement lowers 822 of the apron reinforcements 8 described above.

As illustrated in FIG. 3, the lower ends of the suspension housings 12 are connected to the flange part of the side frame outer 102 of the front side frame 10. It should be noted here that the lower end of the rear reinforcing part 123 of the suspension housing 12 is connected to the flange part of the side frame outer 102 of the front side frame 10 in substantially the same position in the vehicle front-rear direction as an upper base part 163 of the rear joint member 16, which will be described later, as illustrated in FIG. 3.

As illustrated in FIG. 13 and FIG. 16, the suspension tower 121 is formed by a top plate portion that is substantially circular in plan view and a side surface portion that extends from the edge on the inner side in the vehicle width direction of the top plate toward the vehicle lower side and becomes the side surface on the inner side in the vehicle width direction. The top plate portion of the suspension towers 121 is provided with the damper mount part 121a of a substantially circular shape in plan view to which the upper end of the front suspension damper 20 is attached.

As illustrated in FIG. 13 and FIG. 16, the front side reinforcing part 122 is formed as a reinforcing part that reinforces the vehicle front side of the suspension tower 121. This front side reinforcing part 122 is formed in a shape obtained by raising the range from substantially the same position in the vehicle up-down direction as the top plate portion of the suspension tower 121 to the lower portion of the suspension housings 12 toward the inner side in the vehicle width direction.

As illustrated in FIG. 13 and FIG. 16, the rear reinforcing part 123 is formed as a reinforcing part that reinforces the vehicle rear side of the suspension tower 121. This rear reinforcing part 123 is formed in a shape obtained by raising the range from the position on the vehicle upper side of the top plate portion of the suspension tower 121 to the lower portion of the suspension housings 12 toward the inner side in the vehicle width direction.

As illustrated in FIG. 7, FIG. 16, and FIG. 17, the apron reinforcement structural part 124 is formed in a shape that integrally extends the upper ends of the suspension tower 121, the front side reinforcing part 122, and the rear reinforcing part 123 toward the outer side in the vehicle width direction and forms a closed cross section extending in the vehicle front-rear direction together with the apron reinforcement upper 821 of the apron reinforcement 8.

Specifically, the apron reinforcement structural part 124 is formed so that the cross sectional shape in a vertical cross section along the vehicle width direction is a substantially hat shape that projects toward the vehicle lower side and is continuous with the lower panel 823 of the apron reinforcement 8 in the state in which the apron reinforcement structural part 124 is connected to the lower panel 823. On the surface on the outer side in the vehicle width direction of the suspension housing 12 having the structure described above, a front side support part 125 that swingably supports a front joint part of the upper arm 21 and a rear side support part 126 that swingably supports a rear joint part of the upper arm 21 are formed in positions on both sides in the vehicle front-rear direction of the suspension towers 121, as illustrated in FIG. 3, FIG. 13, and FIG. 17.

The front side support parts 125 are formed like a pair of wall surfaces erected toward the outer side in the vehicle width direction along both ends in the vehicle front-rear direction of the front side reinforcing parts 122. The rear side support parts 126 are formed like a pair of wall surfaces erected toward the outer side in the vehicle width direction along both ends in the vehicle front-rear direction of the rear reinforcing parts 123.

In addition, as illustrated in FIG. 2 and FIG. 5, the tower bar 13 joins the upper surfaces of the rear reinforcing parts 123 of the left and right suspension housings 12 via the cowl box 3. Specifically, as illustrated in FIG. 2 and FIG. 5, the tower bar 13 includes a pipe-shaped bar body 131 that joins the rear reinforcing parts 123 of the left and right suspension housings 12 and a holding member 132 that holds the rear end of the bar body 131 and is joined to the cowl box 3.

As illustrated in FIG. 2, FIG. 5, and FIG. 7, the bar body 131 is integrally formed like a substantially V-shape in plan view by a pair of left and right flange portions 131a joined to the rear reinforcing parts 123 of the suspension housings 12, a pair of left and right long length portions 131b extending substantially linearly from the flange portions 131*a* to the vehicle rear side and the inner side in the vehicle width direction toward the vicinity of substantially the middle of the cowl box 3 in the vehicle width direction, and a joint portion 131*c* that joins the rear ends of the long length portions 131*b*.

As illustrated in FIG. 1, FIG. 2, and FIG. 5, the holding member 132 is formed in a shape that integrally holds the vicinity of the rear ends of the left and right long length portions 131*b* and the joint portion 131*c*, and is connectable to the upper surface of the gate-shaped part 5*a* of the reinforcing member 6.

As illustrated in FIG. 5, the tower bar 13 described above is jointed to the cowl box 3 that is a closed cross section member via the reinforcing member 6 that forms a closed cross section together with the dash panel 4 and the cowl box 3 by connecting the holding member 132 onto the upper surface of the gate-shaped part 5*a* of the reinforcing member 6.

In addition, as illustrated in FIG. 18, the sub-frame 14 is formed in a substantially ladder shape in plan view by a pair of left and right side members 141 extending in the vehicle front-rear direction in positions separated from each other in the vehicle width direction and a front side suspension cross member 142, a middle suspension cross member 143, and a rear side suspension cross member 144 that join the left and right side members 141 in the vehicle width direction. More specifically, as illustrated in FIG. 2, the side members 141 are provided slightly closer to the inner side in the vehicle width direction than the front side frames 10 in plan view.

As illustrated in FIG. 18, the side members 141 are closed cross section members in which the cross sectional shape in a vertical cross section along the vehicle width direction is substantially rectangular closed cross section and formed in a shape having substantially the same length in the vehicle front-rear direction as the length of the front side frames 10 in the vehicle front-rear direction. It should be noted here that the front ends and the rear ends of the side members 141 are formed in shapes bent toward the outer side in the vehicle width direction, as illustrated in FIG. 18.

Furthermore, as illustrated in FIG. 18, in the side members 141, front side support brackets 145 that swingably support the joint parts of the lower arms 22 on the vehicle front side are connected to portions on the vehicle front side of the rear joint members 16 described later and rear side support brackets 146 that swingably support the joint parts of the lower arms 22 on the vehicle rear side are fastened and fixed to portions on the vehicle rear side of the rear joint members 16.

In addition, as illustrated in FIG. 9 and FIG. 18, an insertion hole (not illustrated) into which a fastening member 147 (to be fastened and fixed to the lower surface of the rear end of the front side frame 10) is inserted is opened and formed in the upper surface of the rear end of the side member 141.

As illustrated in FIG. 18, the front side suspension cross member 142 joins the front ends of the side members 141 in the vehicle width direction. As illustrated in FIG. 18, the front side suspension cross member 142 is a closed cross section member in which the cross sectional shape of the vertical cross section along the vehicle front-rear direction is a closed cross section and includes a member upper with a substantially hat-shaped cross section projecting toward the vehicle upper side and a member lower that is substantially planar.

As illustrated in FIG. 18, the middle suspension cross member 143 joins the left and right side members 141 in the vehicle width direction in a position separated from the front side suspension cross member 142 toward the vehicle rear side by a predetermined distance. This middle suspension cross member 143 is formed in a shape having a rear closed cross section part 143*a* that is a closed cross section portion joining the left and right side members 141 in substantially the same position in the vehicle front-rear direction as the rear reinforcing part 123 of the suspension housing 12 and a front closed cross section part 143*b* that is a closed cross section portion joining the left and right side members 141 in a position separated from the rear closed cross section part 143*a* toward the vehicle front side.

Specifically, as illustrated in FIG. 18, the middle suspension cross member 143 is formed by the rear closed cross section part 143*a* that is a closed cross section portion extending in the vehicle width direction on the vehicle rear side by connecting a member upper that projects toward the vehicle upper side and has an opening on the outer side in the vehicle width direction and is substantially H-shaped in plan view and a member lower that is substantially planar in the vehicle up-down direction and the front closed cross section part 143*b* that is a closed cross section portion extending in the vehicle width direction on the vehicle front side.

As illustrated in FIG. 18, the rear side suspension cross member 144 joins the rear ends of the side members 141 in the vehicle width direction. As illustrated in FIG. 18, this rear side suspension cross member 144 is a closed cross section member in which the cross sectional shape in a vertical cross section along the vehicle front-rear direction is a closed cross section and includes a member upper having a cross section like a hat shape projecting toward the vehicle upper side and a member lower that is substantially planar.

In addition, as illustrated in FIG. 11, FIG. 12, and FIG. 18, the pair of left and right front joint members 15 are formed in a shape obtained by extending a substantially rectangular closed cross section toward the vehicle upper side and the outer side in the vehicle width direction and then extending the closed cross section toward the outer side in the vehicle width direction. As illustrated in FIG. 12, each of the front joint members 15 connects the lower surface of the side frame outer 102 of the front side frame 10 and the front side suspension cross member 142 of the sub-frame 14 in the vehicle up-down direction in substantially the same position in vehicle front-rear direction as the lower end of the shroud member 11.

More specifically, as illustrated in FIG. 11, FIG. 12, and FIG. 18, in the front joint member 15, the cross sectional shape in a vertical cross section along the vehicle front-rear direction is a substantially rectangular closed cross section. The front joint member 15 is formed by connecting, in the vehicle up-down direction, a member upper that has a substantially gate-shaped cross section and an opening on the vehicle lower side and a member lower that has a substantially gate-shaped cross section and an opening on the vehicle upper side.

In addition, as illustrated in FIG. 12 and FIG. 18, in the front joint member 15, a fastening member 151 for fastening and fixing to the front side frame 10 is provided integrally on an upper surface on the outer side in the vehicle width direction.

As illustrated in FIG. 12, between the plate member 103 and the first link member 104 in the vehicle front-rear direction, the front connecting member 15 is fastened and fixed to the lower surface of the side frame outer 102 via the fastening member 151 so that the upper surface on the outer side in the vehicle width direction faces the shroud member 11 in the vehicle up-down direction.

In addition, as illustrated in FIG. 3 and FIG. 13, the rear joint member 16 joins the lower surface of the side frame outer 102 of the front side frame 10 and the side member 141 of the sub-frame 14 in the vehicle up-down direction in substantially the same position in the vehicle front-rear direction as the rear reinforcing parts 123 of the suspension housing 12.

In other words, as illustrated in FIG. 13, the rear joint member 16 joins the lower surface of the side frame outer 102 of the front side frame 10 and the side member 141 of the sub-frame 14 in the vehicle up-down direction in substantially the same position in the vehicle front-rear direction as the third link member 106 provided in the front side frame 10.

As illustrated in FIG. 18, this rear joint member 16 is an aluminum die-cast high-rigidity member and formed integrally by a lower base part 161 that is fastened and fixed to the side member 141, a housing and holding part 162 in which an engine mount bush (not illustrated) is accommodated and held, and the upper base part 163 provided with a fastening member 164 for fastening and fixing to the front side frame 10.

As illustrated in FIG. 18, the housing and holding part 162 is formed in a substantially cylindrical shape extending from the lower base part 161 toward the vehicle upper side and the inner side in the vehicle width direction. Although not illustrated in detail, this housing and holding part 162 is formed so as to be able to accommodate the engine mount bush that elastically supports an engine (not illustrated) therein.

As illustrated in FIG. 13, the upper base part 163 is formed integrally with the outer side in the vehicle width direction of the housing and holding part 162 so as to be located in substantially the same position in the vehicle front-rear direction as the third link member 106 in the state in which the upper base part 163 is fastened and fixed to the sub-frame 14.

As illustrated in FIG. 19 to FIG. 22, in the front body of the vehicle 1 having the structure described above, the members constituting the body frame described above are joined to each other to form a plurality of ring-shaped structural frames that are substantially ring-shaped and the plurality of ring-shaped structural frames are joined to each other to form a substantially three-dimensionally ring-shaped structural frame that is substantially ring-shaped three-dimensionally.

Specifically, as illustrated in FIG. 19 to FIG. 21, in the front body of the vehicle 1, the first ring-shaped structural frame W1 that passes through the shroud upper 9 and is substantially ring-shaped in front view, the second ring-shaped structural framering-shaped structural frame W2 that passes through the suspension housings 12 and is substantially ring-shaped in front view, the third ring-shaped structural framering-shaped structural frame W3 that passes through the dash cross member 5 and is substantially ring-shaped in front view, the fourth ring-shaped structural framering-shaped structural frame W4 that passes through the dash cross member 5 and the sub-frame 14 and is substantially ring-shaped in front view, and the fifth ring-shaped structural framering-shaped structural frame W5 that passes through the torque box 7 and the sub-frame 14 and is substantially ring-shaped in front view are formed.

In addition, in the front body of the vehicle 1, as illustrated in FIG. 22, the sixth ring-shaped structural framering-shaped structural frame W6 that passes through the apron reinforcements 8 and is substantially ring-shaped in side view and the seventh ring-shaped structural framering-shaped structural frame W7 that passes through the sub-frame 14 and is substantially ring-shaped in side view are formed.

In the front body of the vehicle 1, the first ring-shaped structural framering-shaped structural frame W1, the second ring-shaped structural framering-shaped structural frame W2, the third ring-shaped structural framering-shaped structural frame W3, the fourth ring-shaped structural framering-shaped structural frame W4, and the fifth ring-shaped structural framering-shaped structural frame W5 that are substantially ring-shaped in front view are joined by the left and right apron reinforcements 8, the left and right front side frames 10, and the left and right side members 141 of the sub-frame 14 so that these frames W1, W2, W3, W4, and W5 are connected to each other via the sixth ring-shaped structural framering-shaped structural frame W6 and the seventh ring-shaped structural framering-shaped structural frame W7.

Specifically, as illustrated in FIG. 19, the first ring-shaped structural framering-shaped structural frame W1 that is substantially ring-shaped in front view includes the shroud upper 9 that is a closed cross section member, the front side frames 10 that is a closed cross section member surrounded by the plate members 103 and the first link member 104, the left and right shroud members 11 that are closed cross section members, the front side suspension cross member 142 of the sub-frame 14 that is a closed cross section member, and the left and right front joint members 15 that are closed cross section members.

In addition, as illustrated in FIG. 20, the second ring-shaped structural framering-shaped structural frame W2 that is substantially ring-shaped in front view includes the left and right front side frames 10 that are closed cross section members having the third link members 106, the rear reinforcing parts 123 of the left and right suspension housings 12 that are high rigidity members, the tower bar 13 that is a closed cross section member, the rear closed cross section part 143a of the middle suspension cross member 143 of the sub-frame 14 that is a closed cross section member, and the left and right rear joint members 16 that are high rigidity members.

In addition, as illustrated in FIG. 21, the third ring-shaped structural framering-shaped structural frame W3 that is substantially ring-shaped in front view includes the left and right hinge pillars 2 that are closed cross section members, the cowl box 3 that is a closed cross section member, and the dash cross member 5 that forms a closed cross section extending in the vehicle width direction together with the dash panel 4.

In addition, as illustrated in FIG. 21, the fourth ring-shaped structural framering-shaped structural frame W4 that is substantially ring-shaped in front view includes the left and right hinge pillars 2 that are closed cross section members, the cowl box 3 that is a closed cross section member, the horizontal extending part 5b of the dash cross member 5 that forms a closed cross section together with the dash panel 4, the left and right front side frames 10 that are closed cross section members, the side members 141 of the sub-frame 14 that is a closed cross section member, and the rear side suspension cross member 144.

In addition, as illustrated in FIG. 21, the fifth ring-shaped structural framering-shaped structural frame W5 that is substantially ring-shaped in front view includes the left and right hinge pillars 2 that are closed cross section members, the cowl box 3 that is a closed cross section member, the torque box 7 that forms a closed cross section together with the dash panel 4, the left and right front side frames 10 that are closed cross section members, the side members 141 of the sub-frame 14 that are closed cross section members, and the rear side suspension cross member 144.

In addition, as illustrated in FIG. 22, the sixth ring-shaped structural framering-shaped structural frame W6 that is substantially ring-shaped in side view includes the hinge pillars 2 that are closed cross section members, the dash cross member 5 that forms a closed cross section together with the dash panel 4, the apron reinforcements 8 that are closed cross section members, the front side frames 10 that are closed cross section members, and the shroud members 11 that are closed cross section members.

As illustrated in FIG. 22, the seventh ring-shaped structural framering-shaped structural frame W7 that is substantially ring-shaped in side view includes the front side frames 10 that are closed cross section members, the side members 141 of the sub-frame 14 that are closed cross section members, and the front joint members 15 that are closed cross section members.

As described above, in the front body of the vehicle 1, the first ring-shaped structural framering-shaped structural frame W1, the second ring-shaped structural framering-shaped structural frame W2, the third ring-shaped structural framering-shaped structural frame W3, the fourth ring-shaped structural framering-shaped structural frame W4, and the fifth ring-shaped structural framering-shaped structural frame W5 that are formed in positions separated from each other by predetermined distances in the vehicle front-rear direction and ring-shaped in front view are joined in the vehicle front-rear direction by the left and right sixth ring-shaped structural framering-shaped structural frames W6 and the left and right seventh ring-shaped structural framering-shaped structural frames W7 that are substantially ring-shaped in side view.

Accordingly, in the front body of the vehicle 1, a substantially cage-shaped three-dimensional ring-shaped structural framering-shaped structural frame is formed by the first ring-shaped structural framering-shaped structural frame W1, the second ring-shaped structural framering-shaped structural frame W2, the third ring-shaped structural framering-shaped structural frame W3, the fourth ring-shaped structural framering-shaped structural frame W4, and the fifth ring-shaped structural framering-shaped structural frame W5 that are ring-shaped in front view and the sixth ring-shaped structural framering-shaped structural frames W6 and the seventh ring-shaped structural framering-shaped structural frames W7 that are substantially ring-shaped in side view.

As described above, the front body structure of the vehicle 1 includes the pair of left and right apron reinforcements 8 that are closed cross section members extending in the vehicle front-rear direction in positions separated from each other in the vehicle width direction of the vehicle 1, the pair of left and right front side frames 10 that are closed cross section members extending in the vehicle front-rear direction on the vehicle lower side of the apron reinforcements 8, the pair of left and right suspension housings 12 that support the upper ends of the front suspension dampers 20 in desired positions separated from the dash panel 4 toward the vehicle front side by a predetermined distance and are provided across the apron reinforcements 8 and the front side frames 10, and the sub-frame 14 that is provided on the vehicle lower side of the front side frames 10 and swingably supports the lower arms 22. The front body structure of the vehicle 1 further includes the shroud upper 9 that is a closed cross section member joining the front ends of the apron reinforcements 8 in the vehicle width direction, the pair of left and right shroud members 11 that are closed cross section members joining the shroud upper 9 and the front ends of the front side frames 10 to each other in the vehicle up-down direction, the pair of left and right front joint members 15 that are closed cross section members joining the front ends of the front side frames 10 and the sub-frame 14 to each other in the vehicle up-down direction, in which the sub-frame 14 has the front side suspension cross member 142 that is a closed cross section member joining the lower ends of the front joint members 15 in the vehicle width direction and, even when the shroud members 11 are joined to the upper surfaces and the side surfaces of the front side frames 10 and the suspension housings 12 are thereby provided in positions separated from the dash panel 4 toward the vehicle front side, can improve the body rigidity against the load acting on the front body.

Specifically, in the front body structure of the vehicle 1, the first ring-shaped structural framering-shaped structural frame W1 that is substantially ring-shaped in front view can be formed by the shroud upper 9, the left and right the shroud members 11, the left and right front joint members 15, and the front side suspension cross member 142 of the sub-frame 14 in a position on the vehicle front side of the suspension housings 12.

Since the rear ends of the apron reinforcements 8 and the rear ends of the front side frames 10 are joined to the body frames constituting the vehicle interior of the vehicle 1, the front body structure of the vehicle 1 can support the suspension housings 12 via the body frames constituting the vehicle interior and the first ring-shaped structural framering-shaped structural frame W1 that is substantially ring-shaped in front view formed on the vehicle front side of the suspension housings 12.

Since the shroud members 11 are joined to the upper surfaces and the side surfaces of the front side frames 10 in the first ring-shaped structural framering-shaped structural frame W1 that is substantially ring-shaped in front view, the front body structure of the vehicle 1 can improve the rigidity of the joint portion between the front side frames 10 and the shroud members 11. Accordingly, the front body structure of the vehicle 1 can improve the rigidity of the first ring-shaped structural framering-shaped structural frame W1 that is substantially ring-shaped in front view formed on the vehicle front side of the suspension housings 12.

This can improve the body rigidity against the load acting on the suspension housings 12 and the load acting on the sub-frame 14 in the front body structure of the vehicle 1. Accordingly, the front body structure of the vehicle 1 can prevent the apron reinforcements 8 and the front side frames 10 from being bent and deformed in different directions between the left and right portions when, for example, loads via the front suspension dampers 20 act on the left and right suspension housings 12 at different timings.

Accordingly, the front body structure of the vehicle 1 can improve the body rigidity against the load acting on the front body even when the suspension housings 12 are provided in a position separated from the dash panel 4 toward the vehicle front side.

In addition, since the front side frames 10 have the substantially planar plate members 103 that are connected to the front ends of the front side frames 10 and the first link members 104 that separate the internal spaces of the front side frames 10 in the vehicle front-rear direction in substantially the same positions in vehicle front-rear direction as the rear ends of the front joint members 15, the front body structure of the vehicle 1 can join the closed cross sections of the shroud members 11 and the closed cross sections of the front joint members 15 to each other by the closed cross sections of the front side frames 10 including the plate members 103 and the first link member 104. Accordingly, the front body structure of the vehicle 1 can further improve the rigidity of the body frames that join the apron reinforcements 8 and the sub-frame 14 to each other.

Accordingly, the front body structure of the vehicle 1 can improve the rigidity of the first ring-shaped structural framering-shaped structural frame W1 against, for example, turning moments acting on the suspension housings 12 in front view or plan view or loads acting on the suspension housings 12 at different timings.

Accordingly, the front body structure of the vehicle 1 can improve the body rigidity against the load acting on the front body using the plate members 103 and the first link member 104 provided in the front side frames 10.

In addition, since the shroud members 11 have the closed cross section parts (outer side surface structural part 112 and front surface structural part 113) that form closed cross sections together with the front side frames 10 in a horizontal plane along the vehicle width direction, the front body structure of the vehicle 1 can improve the continuity between the closed cross sections of shroud members 11 and the closed cross sections of the front side frames 10 more surely. Accordingly, the front body structure of the vehicle 1 can further improve the rigidity of the joint portions between the front side frames 10 and the shroud members 11.

Accordingly, the front body structure of the vehicle 1 can further improve the rigidity of the first ring-shaped structural framering-shaped structural frame W1 that is substantially ring-shaped in front view formed on the vehicle front side of the suspension housings 12, thereby improving the body rigidity against the load acting on the front body.

In addition, since the suspension housings 12 have the damper mount parts 121*a* to which the front suspension dampers 20 are attached and the apron reinforcements 8 are formed in a shape extending from the rear ends thereof joined to the hinge pillars 2 substantially linearly toward the vehicle front side and the inner side in the vehicle width direction through the outer side in the vehicle width direction of the damper mount parts 121*a* in plan view, the front body structure of the vehicle 1 can obtain a larger space on the outer sides in the vehicle width direction of the apron reinforcements 8 in a position closer to the vehicle front side than in the apron reinforcements 8 formed in a shape extending substantially linearly from the hinge pillars 2 to the vehicle front side in plan view. Accordingly, in the front body structure of the vehicle 1, for example, the shapes of a front fender or a head light can be prevented from being limited by the apron reinforcements 8.

In addition, since the apron reinforcements 8 extend substantially linearly from the rear ends thereof joined to the hinge pillars 2 toward the vehicle front side and the inner side in the vehicle width direction, the length in the vehicle width direction of the first ring-shaped structural framering-shaped structural frame W1 that is substantially ring-shaped in front view can be suppressed and the rigidity of the first ring-shaped structural frame W1 that is substantially ring-shaped in front view can be improved in the front body structure of the vehicle 1.

In addition, in the front body structure of the vehicle 1, the apron reinforcements 8 can be disposed closer to the front suspension dampers 20 provided in desired positions than in the apron reinforcements 8 formed in a shape extending from the rear ends thereof toward the vehicle front side substantially linearly.

In other words, in the front body structure of the vehicle 1, the distance in the vehicle width direction between the damper mount parts 121*a* of the suspension housings 12 and the apron reinforcements 8 can be smaller than in the apron reinforcements 8 extending from the rear ends thereof toward the vehicle front side substantially linearly.

Accordingly, in the front body structure of the vehicle 1, the size and weight reduction and the high rigidity of the suspension housings 12 can be achieved and the bending moments acting on the joint portions between the suspension housings 12 and the apron reinforcements 8 can be suppressed. Accordingly, in the front body structure of the vehicle 1, when loads act on the suspension housings 12 via the front suspension dampers 20, it is possible to prevent the suspension housings 12 from falling and deforming to the inner side in the vehicle width direction.

Accordingly, the front body structure of the vehicle 1 can improve the flexibility of a vehicle design and further improve the body rigidity against the load acting on the front body using the apron reinforcements 8 having a shape extending from the rear end toward the vehicle front side and the inner side in the vehicle width direction in plan view.

The correspondence between the structure of the present disclosure and the above embodiment will be described. The suspension arm in the present disclosure corresponds to the lower arm 22 in the embodiment. The same applies to the following: the joint members correspond to the front joint members 15, the suspension cross member corresponds to the front side suspension cross member 142, the link member corresponds to the first link member 104, the closed cross section parts correspond to the outer side surface structural part 112 and the front surface structural part 113, but the present disclosure is not limited to only the structure of the above embodiment and other many embodiments can be obtained.

For example, although the shroud members 11 are connected to the side surfaces on the outer side in the vehicle width direction and the upper surfaces of the front side frames 10 in the above embodiment, the present disclosure is not limited to this example and the shroud members may be connected to both side surfaces in the vehicle width direction and the upper surfaces of the front side frames 10.

In addition, although the rear end of the tower bar 13 is joined to the cowl box 3, the present disclosure is not limited to this example and, for example, the left and right hinge pillars 2 may be joined in the vehicle width direction in the vicinity of the cowl box 3 and the rear end of the tower bar 13 may be joined to the dash cross member that forms a closed cross section together with the dash panel 4.

In addition, although the rear end of the tower bar 13 is joined to the cowl box 3 via the reinforcing member 6, the present disclosure is not limited to this example and the rear end of the tower bar 13 may be directly connected to the cowl box 3.

In addition, although the left and right long length portions 131*b* of the bar body 131 of the tower bar 13 are joined to the cowl box 3 via the joint portion 131*c* and the holding member 132, the present disclosure is not limited to this example and the rear ends of left and right long length joint members formed as separate bodies may be joined to the cowl box as a pair of left and right long length joint members including the flange portions 131*a* and the long length portions 131*b*.

In addition, although the rear joint members 16 have the housing and holding parts 162 in which the engine mount bushes are accommodated, the present disclosure is not limited to this example and mount-integrated joint members with attachment parts having upper surfaces to which the engine mount bushes are attached and fixed may be used instead.

In addition, although the front side reinforcing parts 122 and the rear reinforcing parts 123 of the suspension housings 12 are the reinforcing parts having shapes raised to the inner side in the vehicle width direction, the present disclosure is not limited to this example and the reinforcing parts may include a plurality of ribs that extend in the vehicle up-down direction and are erected toward the inner side in the vehicle width direction.

In addition, the suspension housings 12 may be aluminum die-cast suspension housings or suspension housings formed by press-forming a steel plate. In the case of suspension housings formed by press-forming a steel plate, the front reinforcing parts and rear reinforcing parts of the suspension housings are formed by open cross section members that form closed cross sections extending in the vehicle up-down direction together with the suspension tower.

In addition, although one third link member 106 is provided in the internal space of the front side frame 10 between the suspension housing 12 and the rear joint member 16, the present disclosure is not limited to this example and two link members may be disposed separately from each other by a predetermined distance in the internal space of the front side frame 10 between the suspension housing 12 and the rear joint member 16.

In addition, although the ring-shaped structural frame joined to the first ring-shaped structural frame W1 and the second ring-shaped structural frame W2 via the apron reinforcements 8, the front side frames 10, and the side members 141 of the sub-frame 14 is the third ring-shaped structural frame W3, the present disclosure is not limited to this example and the ring-shaped structural frame connected to the first ring-shaped structural frame W1 and the second ring-shaped structural frame W2 may be the fourth ring-shaped structural frame W4 or the fifth ring-shaped structural frame W5. Alternatively, the ring-shaped structural frames connected to the first ring-shaped structural frame W1 and the second ring-shaped structural frame W2 may be the third ring-shaped structural frame W3, the fourth ring-shaped structural frame W4, and the fifth ring-shaped structural frame W5.

What is claimed is:

1. A front body structure of a vehicle, comprising:
    a pair of left and right apron reinforcements that are closed cross section members extending in a vehicle front-rear direction in positions separated from each other by a predetermined distance in a vehicle width direction;
    a pair of left and right front side frames that are closed cross section members extending in the vehicle front-rear direction on a vehicle lower side of the apron reinforcements;
    a pair of left and right suspension housings that support upper ends of front suspension dampers in desired positions separated from a dash panel toward a vehicle front side, the suspension housings being provided across the apron reinforcements and the front side frames;
    a sub-frame provided on the vehicle lower side of the front side frames, the sub-frame swingably supporting a suspension arm;
    a shroud upper that is a closed cross section member joining front ends of the apron reinforcements to each other in the vehicle width direction;
    a pair of left and right shroud members that are closed cross section members joining the shroud upper and front ends of the front side frames to each other in a vehicle up-down direction; and
    a pair of left and right joint members that are closed cross section members joining the front ends of the front side frames and the sub-frame to each other in the vehicle up-down direction,
    wherein the sub-frame has a suspension cross member that is a closed cross section member joining lower ends of the joint members to each other in the vehicle width direction, and
    the shroud members are joined to upper surfaces and side surfaces of the front side frames.

2. The front body structure of the vehicle according to claim 1, wherein
    the front side frames have substantially planar plate members connected to the front ends of the front side frames, and
    link members that separate, in the vehicle front-rear direction, internal spaces of the front side frames in substantially the same positions in the vehicle front-rear direction as rear ends of the joint members.

3. The front body structure of the vehicle according to claim 1, wherein
    the shroud members have closed cross section parts that form closed cross sections together with the front side frames in a horizontal cross section along the vehicle width direction.

4. The front body structure of the vehicle according to claim 2, wherein
    the shroud members have closed cross section parts that form closed cross sections together with the front side frames in a horizontal cross section along the vehicle width direction.

5. The front body structure of the vehicle according to claim 1, wherein
    the suspension housings have damper mount parts to which the front suspension dampers are mounted, and
    the apron reinforcements are formed in a shape extending substantially linear from rear ends thereof joined to hinge pillars toward the vehicle front side and an inner side in the vehicle width direction through an outer side in the vehicle width direction of the damper mount parts in plan view.

6. The front body structure of the vehicle according to claim 2, wherein
    the suspension housings have damper mount parts to which the front suspension dampers are mounted, and
    the apron reinforcements are formed in a shape extending substantially linear from rear ends thereof joined to hinge pillars toward the vehicle front side and an inner side in the vehicle width direction through an outer side in the vehicle width direction of the damper mount parts in plan view.

7. The front body structure of the vehicle according to claim 3, wherein
    the suspension housings have damper mount parts to which the front suspension dampers are mounted, and
    the apron reinforcements are formed in a shape extending substantially linear from rear ends thereof joined to hinge pillars toward the vehicle front side and an inner side in the vehicle width direction through an outer side in the vehicle width direction of the damper mount parts in plan view.

8. The front body structure of the vehicle according to claim 4, wherein
the suspension housings have damper mount parts to which the front suspension dampers are mounted, and
the apron reinforcements are formed in a shape extending substantially linear from rear ends thereof joined to hinge pillars toward the vehicle front side and an inner side in the vehicle width direction through an outer side in the vehicle width direction of the damper mount parts in plan view.

* * * * *